(12) United States Patent
Cluff et al.

(10) Patent No.: US 12,129,351 B1
(45) Date of Patent: Oct. 29, 2024

(54) METHOD OF MAKING SILICONE-BASED FOAM MATERIAL AND SILICON-BASED MATERIALS FORMED THEREFROM

(71) Applicant: Triad National Security, LLC, Los Alamos, NM (US)

(72) Inventors: Kyle Cluff, Los Alamos, NM (US); Matthew Lee, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 413 days.

(21) Appl. No.: 17/315,146

(22) Filed: May 7, 2021

(51) Int. Cl.
| | |
|---|---|
| *C08J 9/28* | (2006.01) |
| *C04B 38/00* | (2006.01) |
| *C08G 77/00* | (2006.01) |
| *C08G 77/16* | (2006.01) |
| *C08J 9/00* | (2006.01) |
| *C08K 3/36* | (2006.01) |
| *C08K 5/57* | (2006.01) |
| *C08K 9/06* | (2006.01) |
| *C08L 83/04* | (2006.01) |

(52) U.S. Cl.
CPC .............. *C08J 9/28* (2013.01); *C04B 38/00* (2013.01); *C08G 77/16* (2013.01); *C08G 77/80* (2013.01); *C08J 9/0066* (2013.01); *C08K 3/36* (2013.01); *C08K 5/57* (2013.01); *C08K 9/06* (2013.01); *C08L 83/04* (2013.01); *C04B 38/0022* (2013.01); *C04B 2235/483* (2013.01); *C08J 2201/026* (2013.01); *C08J 2201/04* (2013.01); *C08J 2201/0504* (2013.01); *C08J 2205/05* (2013.01); *C08J 2383/06* (2013.01)

(58) Field of Classification Search
CPC ....... C08J 9/28–283; C08J 2383/04–08; C04B 2235/483
See application file for complete search history.

(56) References Cited

U.S. PATENT DOCUMENTS

| | | | |
|---|---|---|---|
| 3,377,311 A | 4/1968 | Malcolm | |
| 4,631,296 A | 12/1986 | Bauman | |
| 5,525,643 A | 6/1996 | Macip-Boulis et al. | |
| 5,780,543 A | 7/1998 | Adachi | |
| 9,540,494 B2 | 1/2017 | Liu et al. | |
| 10,857,758 B2 | 12/2020 | Doi et al. | |
| 2007/0123628 A1* | 5/2007 | Shirasaki | C08L 83/04 524/492 |
| 2010/0113252 A1* | 5/2010 | Bordia | C08J 3/24 524/588 |

(Continued)

FOREIGN PATENT DOCUMENTS

| | | | | |
|---|---|---|---|---|
| WO | WO-03104312 A1 * | 12/2003 | ............... | C08J 9/28 |
| WO | WO-2019220065 A2 * | 11/2019 | ............ | C08J 9/0061 |

OTHER PUBLICATIONS

Machine Translation of WO03/104312A1. Dec. 18, 2003. (Year: 2003).*

(Continued)

*Primary Examiner* — Stephen E Rieth
(74) *Attorney, Agent, or Firm* — Klarquist Sparkman, LLP

(57) ABSTRACT

Disclosed herein are embodiments of a silicone-based foam material and composition and method embodiments for making the same. Also disclosed are embodiments of a silicon-based material that can be formed from the silicone-based foam material, as well as methods for making the same.

18 Claims, 9 Drawing Sheets

(56) References Cited

U.S. PATENT DOCUMENTS

| | | | | |
|---|---|---|---|---|
| 2010/0260004 | A1* | 10/2010 | Wang | A61M 5/31596 366/130 |
| 2011/0190410 | A1* | 8/2011 | Nozoe | C08G 77/20 521/154 |
| 2019/0001618 | A1* | 1/2019 | Doi | B32B 5/18 |
| 2019/0374921 | A1 | 12/2019 | Mihalcik | |
| 2021/0122893 | A1* | 4/2021 | Irie | C08K 5/5415 |
| 2021/0206938 | A1* | 7/2021 | Ganachaud | C08J 9/0061 |

OTHER PUBLICATIONS

Ahn et al. Periodic Nanotemplating by Selective Deposition of Electroless Gold Island Films on Particle-Lithographed Dimethyldichlorosilane Layers. ACS Nano, 2010, 4(7), 4181-4189. (Year: 2010).*

Bassereau et al. The 2018 biomembrane curvature and remodeling roadmap. J. Phys. D: Appl. Phys. 2018, 51, 343001. (Year: 2018).*

Placin et al. Viscous Sintering Phenomena in Liquid-Liquid Dispersions: Application to the Preparation of Silicone Macroporous Aerogels. J. Phys. Chem. B 2003, 107, 9179-9184. (Year: 2003).*

Silanol Terminated Polydimethylsiloxane, 1,000 cSt. Gelest. https://www.gelest.com/product/DMS-S31/. As viewed on Jun. 13, 2024. (Year: 2024).*

Reschke et al. Micro- and nanospheres from preceramic polymers: process parameters and size control. J. Mater. Sci. 2012, 47, 5655-5660. (Year: 2012).*

Hashimoto et al., "Three-dimensional structure of a sintered macroporous silica gel," *Langmiur*, 17(3): 619-625, Jan. 6, 2001.

Densmore et al., "B61 LEP stress cushion materials," presented at 2012 Defense Programs Foam Workshop, 25 pages, Mar. 3, 2012.

Lee et al., "Advanced manufacturing of porous and composite silicone materials," May 28, 2020.

Reeves et al., "Quantitative morphological characterization of bicontinuous Pickering emulsions via interfacial curvatures," *Soft Matter*, vol. 12, pp. 4082-4092, Mar. 22, 2016.

* cited by examiner

Control    Toluene

Ethanol    $H_2O_2$

METHOD OF MAKING SILICONE-BASED FOAM MATERIAL AND SILICON-BASED MATERIALS FORMED THEREFROM

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The present disclosure is directed to silicon-based materials formed from silicone-based foam materials and methods of making and using the same.

BACKGROUND

Silicone foams are materials used in a variety of different fields and applications. While methods have been developed to make various types of silicone foams, many conventional methods result in silicone foams that suffer from drawbacks, such as deterioration over time, poor mechanical properties, presence of undesirable contaminants, or combinations thereof. Many silicone foams and methods for making such foams that exist in the art today require processing parameters or ingredients that must be carefully tailored to obtain a defined balance between rheological and chemical factors. As such, these foams and methods are often not amenable to industrial scale due to high costs and specialized equipment/reagents needed for implementation. In one method in the art, "MQ-water clusters" are used as a blowing agent to provide a foamed silicone structure. This MQ-water cluster is obtained by combining a pre-formed resin material sold under the tradename BELSIL®, which comprises tetraalkoxysilane (a "Q unit") and trimethylethoxysilane (an "M unit"), with water to form the MQ-water cluster. This method then requires further combining the MQ-water cluster with a silicone fluid to form isolated pockets of water and forming gas bubbles therefrom by converting water into water vapor using heat or reduced pressure.

Silicon-based materials having uniform, continuous pore networks and high surface area are of keen interest in various applications; however, given the scale-up difficulties and high costs associated with making such materials on a suitable scale, it can be difficult to arrive at such materials that have high purity and the desired physical and chemical characteristics.

There exists a need in the art for new methods for making silicone-based foam materials and silicon-based materials, such as porous silica and other types of silicon compounds, that can address drawbacks associated with conventional silicon-based materials the methods used to arrive at such materials.

SUMMARY

Disclosed herein are embodiments of a method, comprising: combining a silicone precursor, a silicon-containing crosslinker, a surfactant, a curing agent, and water to provide a multi-phasic composition; mixing components of the multi-phasic composition to provide a silicone polymer; and removing the water to provide a co-continuous silicone-based foam material comprising (i) a first continuous phase comprising the silicone polymer, and (ii) a second continuous phase provided by one or more pores, wherein the one or more pores comprise walls that are defined by a surface of the silicone polymer and that exhibit substantially negative Gaussian curvature and a substantially zero mean curvature; wherein the silicone precursor has a structure according to Formula I

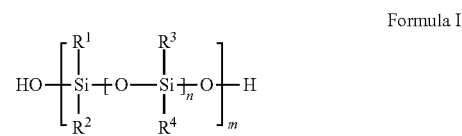

Formula I wherein each $R^1$ independently is selected from hydrogen, aliphatic, heteroaliphatic, haloaliphatic, haloheteroaliphatic, aromatic, or an organic functional group provided by any combination of such groups; $R^2$ independently is selected from hydrogen, aliphatic, heteroaliphatic, haloaliphatic, haloheteroaliphatic, aromatic, or an organic functional group provided by any combination of such groups; each $R^3$ independently is hydrogen, aliphatic, heteroaliphatic, haloaliphatic, haloheteroaliphatic, aromatic, or an organic functional group provided by any combination of such groups; each $R^4$ independently is hydrogen, aliphatic, heteroaliphatic, haloaliphatic, haloheteroaliphatic, aromatic, or an organic functional group provided by any combination of such groups; n is an integer selected from 0 to 1,000,000; m is an integer selected from 1 to 1,000,000; and the silicon-containing crosslinker has a structure according to Formula II

Formula II wherein each X independently is halogen or $OR^5$, wherein each $R^5$ independently is aliphatic, heteroaliphatic, haloaliphatic, haloheteroaliphatic, aromatic, or an organic functional group provided by any combination of such groups; and Y is (i) $OR^5$, wherein each $R^5$ independently is aliphatic, heteroaliphatic, haloaliphatic, haloheteroaliphatic, aromatic, or an organic functional group provided by any combination of such groups; (ii) —O—Si(X')$_3$, wherein each X' independently is halogen or $OR^5$, wherein each $R^5$ independently is aliphatic, heteroaliphatic, haloaliphatic, haloheteroaliphatic, aromatic, or an organic functional group provided by any combination of such groups; or (ii) hydrogen, aliphatic, heteroaliphatic, haloaliphatic, haloheteroaliphatic, aromatic, or an organic functional group provided by any combination of such groups.

Also disclosed herein are embodiments of a method comprising combining a silicone precursor, a silicon-containing crosslinker, a surfactant, a curing agent, and water to provide a multi-phasic composition; mixing components of the multi-phasic composition to provide a silicone polymer; removing the water to provide a co-continuous silicone-based foam material comprising (i) a first continuous phase comprising the silicone polymer, and (ii) a second continuous phase provided by one or more pores, wherein the one or more pores comprise walls that are defined by a surface of the silicone polymer and that exhibit substantially negative Gaussian curvature and a substantially zero mean curvature; exposing the co-continuous silicone-based foam material to a first heat treatment under a gaseous atmosphere to form a co-continuous porous silicon-based material; and exposing the co-continuous porous silicon-based material to a second heat treatment in the presence of air; wherein the silicone precursor has a structure according to Formula I

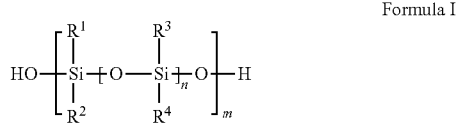

Formula I wherein each $R^1$ independently is selected from hydrogen, aliphatic, heteroaliphatic, haloaliphatic, haloheteroaliphatic, aromatic, or an organic functional group provided by any combination of such groups; $R^2$ independently is selected from hydrogen, aliphatic, heteroaliphatic, haloaliphatic, haloheteroaliphatic, aromatic, or an organic functional group provided by any combination of such groups; each $R^3$ independently is hydrogen, aliphatic, heteroaliphatic, haloaliphatic, haloheteroaliphatic, aromatic, or an organic functional group provided by any combination of such groups; each $R^4$ independently is hydrogen, aliphatic, heteroaliphatic, haloaliphatic, haloheteroaliphatic, aromatic, or an organic functional group provided by any combination of such groups; n is an integer selected from 0 to 1,000,000; m is an integer selected from 1 to 1,000,000; and the silicon-containing crosslinker has a structure according to Formula II

Formula II wherein each X independently is halogen or $OR^5$, wherein each $R^5$ independently is aliphatic, heteroaliphatic, haloaliphatic, haloheteroaliphatic, aromatic, or an organic functional group provided by any combination of such groups; and Y is (i) $OR^5$, wherein each $R^5$ independently is aliphatic, heteroaliphatic, haloaliphatic, haloheteroaliphatic, aromatic, or an organic functional group provided by any combination of such groups; (ii) —O—Si(X')$_3$, wherein each X' independently is halogen or $OR^5$, wherein each $R^5$ independently is aliphatic, heteroaliphatic, haloaliphatic, haloheteroaliphatic, aromatic, or an organic functional group provided by any combination of such groups; or (ii) hydrogen, aliphatic, heteroaliphatic, haloaliphatic, haloheteroaliphatic, aromatic, or an organic functional group provided by any combination of such groups.

The foregoing and other objects and features of the disclosure will become more apparent from the following detailed description, which proceeds with reference to the accompanying figures.

DETAILED DESCRIPTION

I. Overview of Terms

Figure 1:
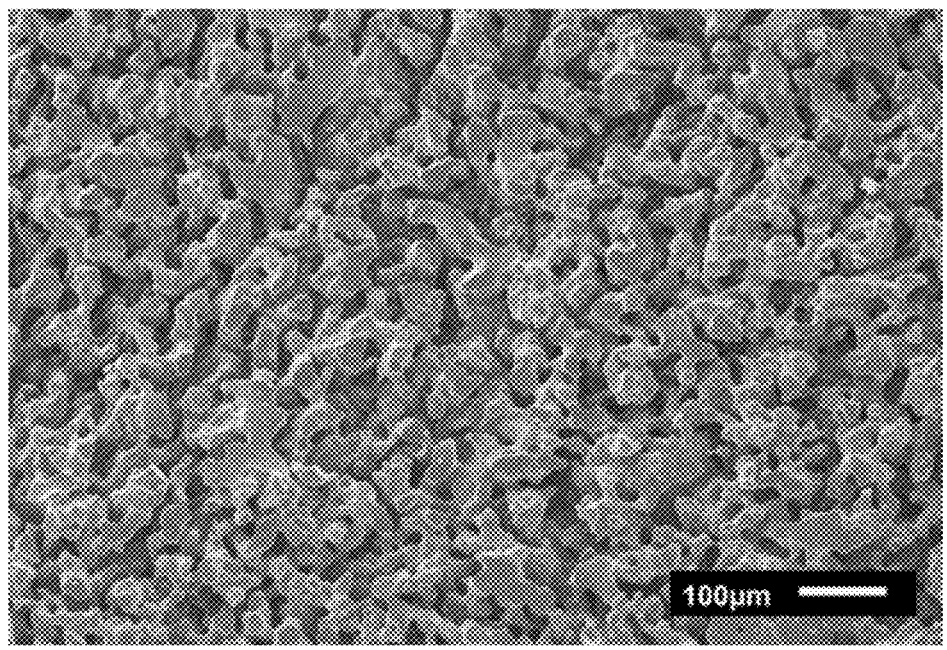
FIG. 1 is a micrograph obtained using scanning electron microscopy (SEM) to analyze a silicone-based foam material made according to the present disclosure.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Although the steps of some of the disclosed methods are described in a particular, sequential order for convenient presentation, it should be understood that this manner of description encompasses rearrangement, unless a particular ordering is required by specific language set forth below. For example, steps described sequentially may in some cases be rearranged or performed concurrently. Additionally, the description sometimes uses terms like "produce" and "provide" to describe the disclosed methods. These terms are high-level abstractions of the actual steps that are performed. The actual steps that correspond to these terms will vary depending on the particular implementation and are readily discernible by one of ordinary skill in the art.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Ranges disclosed herein include all values within the recited range as well as any specified endpoints unless stated otherwise. Furthermore, not all alternatives recited herein are equivalents.

To facilitate review of the various embodiments of the disclosure, the following explanations of specific terms are provided. Certain functional group terms include a symbol "-" which is used to show how the defined functional group attaches to, or within, the compound to which it is bound. Also, a dashed bond (i.e., "---") as used in certain formulas described herein indicates an optional bond (that is, a bond that may or may not be present). A person of ordinary skill in the art would recognize that the definitions provided below and the compounds and formulas included herein are not intended to include impermissible substitution patterns (e.g., methyl substituted with 5 different groups, and the like). Such impermissible substitution patterns are easily recognized by a person of ordinary skill in the art. In formulas and compounds disclosed herein, a hydrogen atom is present and completes any formal valency requirements (but may not necessarily be illustrated) wherever a functional group or other atom is not illustrated. For example, a phenyl ring that is drawn as

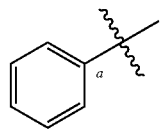

comprises a hydrogen atom attached to each carbon atom of the phenyl ring other than the "a" carbon, even though such hydrogen atoms are not illustrated. Any functional group disclosed herein or defined above can be substituted or unsubstituted, unless otherwise indicated herein.

Acyl Halide: —C(O)X, wherein X is a halogen, such as Br, F, I, or Cl.

Aldehyde: —C(O)H.

Aliphatic: A hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and positional isomers as well.

Aliphatic-aromatic: An aromatic group that is or can be coupled to a compound disclosed herein, wherein the aromatic group is or becomes coupled through an aliphatic group.

Aliphatic-aryl: An aryl group that is or can be coupled to a compound disclosed herein, wherein the aryl group is or becomes coupled through an aliphatic group.

Aliphatic-heteroaryl: A heteroaryl group that is or can be coupled to a compound disclosed herein, wherein the heteroaryl group is or becomes coupled through an aliphatic group.

Alkenyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cycloalkenyl), cis, or trans (e.g., E or Z).

Alkoxy: —O-aliphatic, such as —O-alkyl, —O-alkenyl, —O-alkynyl; with exemplary embodiments including, but not limited to, methoxy, ethoxy, n-propoxy, isopropoxy, n-butoxy, t-butoxy, sec-butoxy, n-pentoxy (wherein any of the aliphatic components of such groups can comprise no double or triple bonds, or can comprise one or more double bonds, one or more triple bonds, or a combination thereof).

Alkyl: A saturated monovalent hydrocarbon having at least one carbon atom to 50 carbon atoms ($C_{1-50}$), such as one to 25 carbon atoms ($C_{1-25}$), or one to ten carbon atoms ($C_{1-10}$), wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Alkynyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Amide: —C(O)NR$^a$R$^b$ or —NR$^a$C(O)R$^b$ wherein each of R$^a$ and R$^b$ independently is selected from hydrogen, aliphatic, heteroaliphatic, haloaliphatic, haloheteroaliphatic, aromatic, or an organic functional group.

Amino: —NR$^a$R$^b$, wherein each of R$^a$ and R$^b$ independently is selected from hydrogen, aliphatic, heteroaliphatic, haloaliphatic, haloheteroaliphatic, aromatic, or an organic functional group.

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system. For example,

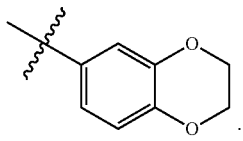 [SMILES: *c1ccc2c(c1)OCCO2 ; "."]

However, in certain examples, context or express disclosure may indicate that the point of attachment is through a non-aromatic portion of the condensed ring system. For example,

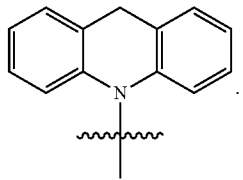 [SMILES: *N1c2ccccc2Cc2ccccc21 ; "."]

An aromatic group or moiety may comprise only carbon atoms in the ring, such as in an aryl group or moiety, or it may comprise one or more ring carbon atoms and one or more ring heteroatoms comprising a lone pair of electrons (e.g. S, O, N, P, or Si), such as in a heteroaryl group or moiety. Aromatic groups may be substituted with one or more groups other than hydrogen, such as aliphatic, heteroaliphatic, haloaliphatic, haloheteroaliphatic, aromatic, or an organic functional group.

Aryl: An aromatic carbocyclic group comprising at least five carbon atoms to 15 carbon atoms ($C_5$-$C_{15}$), such as five to ten carbon atoms ($C_5$-$C_{10}$), having a single ring or multiple condensed rings, which condensed rings can or may not be aromatic provided that the point of attachment to a remaining position of the compounds disclosed herein is through an atom of the aromatic carbocyclic group. Aryl groups may be substituted with one or more groups other than hydrogen, such as aliphatic, heteroaliphatic, haloaliphatic, haloheteroaliphatic, aromatic, or an organic functional group.

Aroxy: —O—(CH$_2$)$_n$aromatic, wherein n is an integer ranging from 0 to 20, such as 0 to 15, or 0 to 10, or 0 to 5.

Azo: —N=NR$^a$ wherein R$^a$ is hydrogen, aliphatic, heteroaliphatic, haloaliphatic, haloheteroaliphatic, aromatic, or an organic functional group.

Carbamate: —OC(O)NR$^a$R$^b$, wherein each of R$^a$ and R$^b$ independently is selected from hydrogen, aliphatic, heteroaliphatic, haloaliphatic, haloheteroaliphatic, aromatic, or an organic functional group.

Carboxyl: —C(O)OH.

Carboxylate: —C(O)O— or salts thereof, wherein the negative charge of the carboxylate group may be balanced with an M$^+$ counterion, wherein M$^+$ may be an alkali ion, such as K$^+$, Na$^+$, Li$^+$; an ammonium ion, such as $^+$N(R$^b$)$_4$ where R$^b$ is H, aliphatic, heteroaliphatic, haloaliphatic, haloheteroaliphatic, or aromatic; or an alkaline earth ion, such as [Ca$^{2+}$]$_{0.5}$, [Mg$^{2+}$]$_{0.5}$, or [Ba$^{2+}$]$_{0.5}$.

Co-Continuous: A structural feature of a silicone-based foam material or the silicon-based material formed therefrom wherein each of the phases of the silicone-based foam material (e.g., a first phase made up by pores that exist throughout the material and a second phase made up of a silicone polymer formed from reaction between a silicone precursor and a silicon-containing crosslinker) or the silicon-based material formed therefrom exist and are each simultaneously continuous throughout the volume of the silicone-based foam material or the silicon-based material formed therefrom. While the terms "co-continuous" and "bi-continuous" may be used interchangeably by people of ordinary skill in the art, the term "co-continuous" as used herein should not be inferred as limiting the disclosure to embodiments comprising only two phases.

Curing Agent: A compound that promotes polymerization, crosslinking, or both polymerization and crosslinking between a silicone precursor and a silicon-containing crosslinker. In particular embodiments, the curing agent is a compound that initiates forming one or more radical species, ionic species, or a combination thereof, from a silicone precursor, a silicon-containing crosslinker, or a combination thereof, to thereby promote polymerization, crosslinking, or both polymerization and crosslinking between these components. In some embodiments, the curing agent is an organometallic compound. In independent embodiments, the curing agent is not, or is other than, chloroplatinic acid (or an alcohol-modified version thereof or a coordination compound thereof); tetrakis(triphenylphosphine)palladium; or chlorotris(triphenylphosphine) rhodium.

Cyano: —CN.

Disulfide: —SSR$^a$, wherein R$^a$ is selected from hydrogen, aliphatic, heteroaliphatic, haloaliphatic, haloheteroaliphatic, aromatic, or an organic functional group.

Dithiocarboxylic: —C(S)SR$^a$ wherein R$^a$ is selected from hydrogen, aliphatic, heteroaliphatic, haloaliphatic, haloheteroaliphatic, aromatic, or an organic functional group.

Ester: —C(O)OR$^a$ or —OC(O)R$^a$, wherein R$^a$ is selected from aliphatic, heteroaliphatic, haloaliphatic, haloheteroaliphatic, aromatic, or an organic functional group.

Ether: -aliphatic-O-aliphatic, -aliphatic-O-aromatic, -aromatic-O-aliphatic, or -aromatic-O-aromatic.

Halo (or halide or halogen): Fluoro, chloro, bromo, or iodo.

Haloaliphatic: An aliphatic group wherein one or more hydrogen atoms, such as one to 10 hydrogen atoms, independently is replaced with a halogen atom, such as fluoro, bromo, chloro, or iodo.

Haloaliphatic-aryl: An aryl group that is or can be coupled to a compound disclosed herein, wherein the aryl group is or becomes coupled through a haloaliphatic group.

Haloaliphatic-heteroaryl: A heteroaryl group that is or can be coupled to a compound disclosed herein, wherein the heteroaryl group is or becomes coupled through a haloaliphatic group.

Haloalkyl: An alkyl group wherein one or more hydrogen atoms, such as one to 10 hydrogen atoms, independently is replaced with a halogen atom, such as fluoro, bromo, chloro, or iodo. In an independent embodiment, haloalkyl can be a $CX_3$ group, wherein each X independently can be selected from fluoro, bromo, chloro, or iodo.

Heteroaliphatic: An aliphatic group comprising at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group. Alkoxy, ether, amino, disulfide, peroxy, and thioether groups are exemplary (but non-limiting) examples of heteroaliphatic. In some embodiments, a fluorophore can also be described herein as a heteroaliphatic group, such as when the heteroaliphatic group is a heterocyclic group.

Heteroaliphatic-aryl: An aryl group that is or can be coupled to a compound disclosed herein, wherein the aryl group is or becomes coupled through a heteroaliphatic group.

Heteroaryl: An aryl group comprising at least one heteroatom to six heteroatoms, such as one to four heteroatoms, which can be selected from, but not limited to oxygen, nitrogen, sulfur, silicon, boron, selenium, phosphorous, and oxidized forms thereof within the ring. Such heteroaryl groups can have a single ring or multiple condensed rings, wherein the condensed rings may or may not be aromatic, may contain a heteroatom, or both, provided that the point of attachment is through an atom of the aromatic heteroaryl group. Heteroaryl groups may be substituted with one or more groups other than hydrogen, such as aliphatic, heteroaliphatic, haloaliphatic, haloheteroaliphatic, aromatic, or an organic functional group. In some embodiments, a fluorophore can also be described herein as a heteroaryl group.

Heteroatom: An atom other than carbon or hydrogen, such as (but not limited to) oxygen, nitrogen, sulfur, silicon, boron, selenium, or phosphorous. In particular disclosed embodiments, such as when valency constraints do not permit, a heteroatom does not include a halogen atom.

Ketone: —C(O)$R^a$, wherein $R^a$ is selected from aliphatic, heteroaliphatic, haloaliphatic, haloheteroaliphatic, aromatic, or an organic functional group.

Lower Alkyl: An alkyl group having from one to ten carbon atoms.

Open-celled: An "open-celled" structure is a feature of embodiments of the silicone-based foam material disclosed herein or the silicon-based material formed therefrom. In such embodiments, the silicone-based foam material or the silicon-based material formed therefrom comprises pores that are in fluid communication with one another.

Organic Functional Group: A functional group that may be provided by any combination of aliphatic, heteroaliphatic, aromatic, haloaliphatic, haloheteroaliphatic groups, or any combination thereof, or that may be selected from, but not limited to, aldehyde; aroxy; acyl halide; halogen; nitro; cyano; azide; carboxyl (or carboxylate); amide; ketone; carbonate; imine; azo; carbamate; hydroxyl; thiol; sulfonyl (or sulfonate); oxime; phosphino; ester; thiocyanate; thioketone; thiocarboxylic acid; thioester; dithiocarboxylic acid or ester; phosphonate; phosphate; silyl ether; sulfinyl; thial; or combinations thereof.

Oxime: —$CR^a$—NOH, wherein $R^a$ is hydrogen, aliphatic, heteroaliphatic, haloaliphatic, haloheteroaliphatic, aromatic, or an organic functional group.

Peroxy: —O—$OR^a$ wherein $R^a$ is hydrogen, aliphatic, heteroaliphatic, haloaliphatic, haloheteroaliphatic, aromatic, or an organic functional group.

Phosphate: —O—P(O)($OR^a$)$_2$, wherein each $R^a$ independently is hydrogen, aliphatic, heteroaliphatic, haloaliphatic, haloheteroaliphatic, aromatic, or an organic functional group; or wherein one or more $R^a$ groups are not present and the phosphate group therefore has at least one negative charge, which can be balanced by a counterion, $M^+$, wherein each $M^+$ independently can be an alkali ion, such as $K^+$, $Na^+$, $Li^+$; an ammonium ion, such as $^+N(R^b)_4$ where $R^b$ is H, aliphatic, heteroaliphatic, haloaliphatic, haloheteroaliphatic, or aromatic; or an alkaline earth ion, such as $[Ca^{2+}]_{0.5}$, $[Mg^{2+}]_{0.5}$, or $[Ba^{2+}]_{0.5}$.

Phosphino: —P($R^a$)$_2$, wherein each $R^a$ independently is hydrogen, aliphatic, heteroaliphatic, haloaliphatic, haloheteroaliphatic, aromatic, or an organic functional group.

Phosphonate: —P(O)($OR^a$)$_2$, wherein each $R^a$ independently is hydrogen, aliphatic, heteroaliphatic, haloaliphatic, haloheteroaliphatic, aromatic, or an organic functional group; or wherein one or more $R^a$ groups are not present and the phosphate group therefore has at least one negative charge, which can be balanced by a counterion, $M^+$, wherein each $M^+$ independently can be an alkali ion, such as $K^+$, $Na^+$, $Li^+$; an ammonium ion, such as $^+N(R^b)_4$ where $R^b$ is H, aliphatic, heteroaliphatic, haloaliphatic, haloheteroaliphatic, or aromatic; or an alkaline earth ion, such as $[Ca^{2+}]_{0.5}$, $[Mg^{2+}]_{0.5}$, or $[Ba^{2+}]_{0.5}$.

Pore: One of a plurality of openings or void spaces in a silicone-based foam material described herein. In some embodiments a pore need not have a spherical shape. A pore can be defined in a silicone-based foam material or the silicon-based material formed therefrom by a surface of the silicone polymer formed from the composition embodiments described herein. In some embodiments, a pore can include a fabricated or naturally occurring pathway created in a silicone-based foam material as described herein or the silicon-based material formed therefrom through which fluid can flow. In some such embodiments, a pore can comprise two dimensions of limited length and one dimension of unspecified length. For example, such a pore could traverse the silicone-based foam material or the silicon-based material formed therefrom in a tortuous path of unspecified length.

Silicon-Based Material: A material comprising the element silicon that is in the form of an oxide, a carbide, a nitride, a sulfide, or a combination thereof and which is formed from heating a silicone-based foam material in the presence of a selected inert atmosphere followed by heating in air. Exemplary silicon-based materials are disclosed herein.

Silyl Ether: —OSi$R^a R^b$, wherein each of $R^a$ and $R^b$ independently is selected from hydrogen, aliphatic, heteroaliphatic, haloaliphatic, haloheteroaliphatic, aromatic, or an organic functional group.

Sulfinyl: —S(O)$R^a$, wherein $R^a$ is selected from hydrogen, aliphatic, heteroaliphatic, haloaliphatic, haloheteroaliphatic, aromatic, or an organic functional group.

Sulfonyl: —SO$_2$R$^a$, wherein R$^a$ is selected from hydrogen, aliphatic, heteroaliphatic, haloaliphatic, haloheteroaliphatic, aromatic, or an organic functional group.

Sulfonamide: —SO$_2$NR$^a$R$^b$ or —N(R$^a$)SO$_2$R$^b$, wherein each of R$^a$ and R$^b$ independently is selected from hydrogen, aliphatic, heteroaliphatic, haloaliphatic, haloheteroaliphatic, aromatic, or an organic functional group.

Sulfonate: —SO$_3^-$, wherein the negative charge of the sulfonate group may be balanced with an M$^+$ counter ion, wherein M$^+$ may be an alkali ion, such as K$^+$, Na$^+$, Li$^+$; an ammonium ion, such as $^+$N(R$^b$)$_4$ where R$^b$ is H, aliphatic, heteroaliphatic, haloaliphatic, haloheteroaliphatic, or aromatic; or an alkaline earth ion, such as [Ca$^{2+}$]$_{0.5}$, [Mg$^{2+}$]$_{0.5}$, or [Ba$^{2+}$]$_{0.5}$.

Thial: —C(S)H.

Thiocarboxylic acid: —C(O)SH, or —C(S)OH.

Thiocyanate: —S—CN or —N=C=S.

Thioester: —C(O)SR$^a$ or —C(S)OR$^a$ wherein R$^a$ is selected from hydrogen, aliphatic, heteroaliphatic, haloaliphatic, haloheteroaliphatic, aromatic, or an organic functional group.

Thioether: —S-aliphatic or —S-aromatic, such as —S-alkyl, —S-alkenyl, —S-alkynyl, —S-aryl, or —S— heteroaryl; or -aliphatic-S-aliphatic, -aliphatic-S-aromatic, -aromatic-S-aliphatic, or -aromatic-S-aromatic.

Thioketone: —C(S)R$^a$ wherein R$^a$ is selected from hydrogen, aliphatic, heteroaliphatic, haloaliphatic, haloheteroaliphatic, aromatic, or an organic functional group.

II. Introduction

Disclosed herein are embodiments of a composition that can be used to make a silicone-based foam material having unique properties and structural features not found in conventional silicone foam materials. Also disclosed are method embodiments for making the disclosed silicone-based foam material. The silicone-based foam material can be used as a precursor to a silicon-based material that can be formed from subjecting the silicone-based foam material to a heat treatment. The resulting silicon-based material can retain the porous structure of the silicone-based foam material.

The disclosed method embodiments provide a more convenient and cost-effective method for arriving at silicone-based foam materials and silicon-based material than other methods used in the art. For example, method embodiments disclosed herein do not require a separate blowing agent to form pores within the silicone-based foam material and instead such pores can be formed by interactions between the components of the composition used to make the material. For example, in some embodiments, pores within the silicone-based foam material can be provided by phase separations between water and a silicone precursor (or a mixture of the silicone precursor, a silicon-containing crosslinker, or other compositional compounds) that occur during the method. As the silicone precursor is cured to provide a solid silicone polymer, the pores can be defined in the material, with the water occupying such pores. Water can then be vacated from the pores by drying. The pores are not formed by vaporizing water using heat or exposing the material to reduced pressure to form gas bubbles from the water that become voids within the material. Further, composition embodiments disclosed herein do not comprise an MQ-water cluster or any preformed resin material formed between a tetraalkoxysilane and trimethylethoxysilane.

The silicon-based material embodiments disclosed herein can be made from the silicone-based foam material using a suitable heat treatment. In some such embodiments, the silicone-based foam material can be converted to the silicon-based material using a two-step heat treatment. Silicon-based materials that can be made using this method include, but are not limited to, materials comprising oxides, carbides, nitrides, sulfides (or combinations thereof) of silicon, such ceramic materials like SiOC, SiC, and SiCN.

III. Composition and Product Embodiments

Disclosed herein are embodiments of a composition for use in making silicone-based foam materials that can in turn be used to make the silicon-based materials described herein. The disclosed composition embodiments comprise components that are non-toxic and that do not require significant tuning and/or manipulation to provide the desired foam material. The silicone-based foam materials made using the disclosed composition embodiments exhibit superior resistance to degradation and superior mechanical properties relative to conventional silicone-based foam materials, such as those requiring blowing agents and/or reagents that cannot be easily removed from the resulting material. The silicon-based materials formed from the silicone-based foam materials retain the highly uniform porous nature of the silicone-based foam materials. The silicon-based materials can be co-continuous like their silicone-based foam material precursors.

In particular embodiments, the composition used to make the silicone-based foam material comprises a silicone precursor, a silicon-containing crosslinker, a curing agent, a surfactant, and water. In yet other embodiments, the composition comprises a silicone precursor, a silicon-containing crosslinker, a curing agent, a filler material, and water. The silicone precursor can comprise a monomer or an oligomer material having a silicon-oxygen backbone. In some embodiments, the silicone precursor can have a structure according to Formula I below.

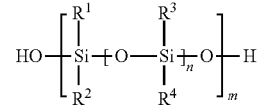

Formula I

With reference to Formula I, each of R$^1$, R$^2$, R$^3$, and R$^4$ can be the same or different; and each R$^1$ and each R$^2$ independently can be the same or different as any other R$^1$ and R$^2$ groups; and each R$^3$ and each R$^4$ independently can be the same or different as any other R$^3$ and R$^4$ groups. In some embodiments, each R$^1$ independently can be selected from hydrogen, aliphatic, heteroaliphatic, haloaliphatic, haloheteroaliphatic, aromatic, or an organic functional group provided by any combination of such groups; each R$^2$ independently can be selected from hydrogen, aliphatic, heteroaliphatic, haloaliphatic, haloheteroaliphatic, aromatic, or an organic functional group provided by any combination of such groups; each R$^3$ independently can be hydrogen, aliphatic, heteroaliphatic, haloaliphatic, haloheteroaliphatic, aromatic, or an organic functional group provided by any combination of such groups; each R$^4$ independently can be hydrogen, aliphatic, heteroaliphatic, haloaliphatic, haloheteroaliphatic, aromatic, or an organic functional group provided by any combination of such groups; and each of m and n independently can be an integer that provides a silicone precursor having an average molecular weight of greater than zero to 500,000 g/mol or more, such as 2,000 g/mol to 500,000 g/mol or 2,000 g/mol to 250,000 g/mol, or 2,000 g/mol to 100,000 g/mol, or 2,000 g/mol to 55,000 g/mol; or m and n can be integers that, when taken together, provide a silicone precursor having an average molecular weight of greater than zero to 500,000 g/mol or more, such as 2,000 g/mol to 500,000 g/mol or 2,000 g/mol to 250,000 g/mol, or 2,000 g/mol to 105,000 g/mol, or 2,000 g/mol to 100,000 g/mol, or 2,000 g/mol to 55,000 g/mol. In some embodiments, each of m can be an integer selected from 1 to 1,000,000, such as 1 to 750,000 or 1 to 500,000; and n can be an integer selected from 0 to 1,000,000, such as 1 to 750,000 or 1 to 500,000. In particular disclosed embodiments, a silicone precursor having an average molecular weight of 54,300 g/mol or a molecular weight of 104, 100 g/mol is used. In some embodiments, n and m are selecting using a formula where (n+1)m=6756 (or less).

In some embodiments, each $R^1$ independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In some embodiments, each $R^2$ independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In some embodiments, each $R^3$ independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In some embodiments, each $R^4$ independently can be independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In particular embodiments, each of $R^1$ and $R^2$ independently can be lower alkyl, such as methyl, ethyl, propyl, butyl, pentyl, hexyl, heptyl, octyl, nonyl, or decyl (including straight chain, branched, and cyclic versions thereof); or phenyl. In particular embodiments, each $R^3$ independently can be lower alkyl, such as methyl, ethyl, propyl, butyl, pentyl, hexyl, heptyl, octyl, nonyl, or decyl (including straight chain, branched, and cyclic versions thereof); or phenyl. In particular embodiments, each $R^4$ independently can be lower alkyl, such as methyl, ethyl, propyl, butyl, pentyl, hexyl, heptyl, octyl, nonyl, or decyl (including straight chain, branched, and cyclic versions thereof); or phenyl. In some representative embodiments, each of $R^1$, $R^2$, $R^3$, and $R^4$ (and each instance of $R^3$ and each instance of $R^4$) independently can be methyl or phenyl. In some representative embodiments, the silicone precursor is a hydroxy-terminated form of polydimethylsiloxane (or PDMS), polydiphenylsiloxane (or PDPS), polydiethylsiloxane (or PDES), poly[dimethylsiloxane-co-(2-(3,4-epoxycyclohexyl)ethyl)methylsiloxane], poly(methylphenylsiloxane), or poly[dimethylsiloxane-co-(3-aminopropyl)methylsiloxane]. In some embodiments, two or more different silicone precursors having structures meeting Formula I can be used.

The silicon-containing crosslinker can be a compound having a structure according to Formula II below.

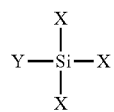

Formula II

With reference to Formula II, each X independently can be the same or different and Y can be the same as or different from any X. In some embodiments, each X independently can be selected from $OR^5$, wherein each $R^5$ independently is aliphatic, heteroaliphatic, haloaliphatic, haloheteroaliphatic, aromatic, or an organic functional group provided by any combination of such groups; or halogen (such as Cl, Br, F, or I). In some embodiments, Y can be $OR^5$, wherein each $R^5$ independently is aliphatic, heteroaliphatic, haloaliphatic, haloheteroaliphatic, aromatic, or an organic functional group provided by any combination of such groups; —O—Si(X')$_3$, wherein each X' independently is selected from the groups specified for X in Formula II; or hydrogen, aliphatic (e.g., lower alkyl, such as methyl, ethyl, propyl, or butyl), heteroaliphatic, haloaliphatic, haloheteroaliphatic, aromatic, or an organic functional group provided by any combination of such groups. In some embodiments, each X of Formula II is $OR^5$ wherein each $R^5$ independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In particular embodiments, each $R^5$ independently can be lower alkyl, such as methyl, ethyl, propyl, butyl, pentyl, hexyl, heptyl, octyl, nonyl, or decyl (including straight chain, branched, and cyclic versions thereof). In some representative embodiments, each X is $OR^5$ wherein each $R^5$ independently can be ethyl or propyl.

In particular embodiments, the silicon-containing crosslinker can have a structure according to Formula IIA.

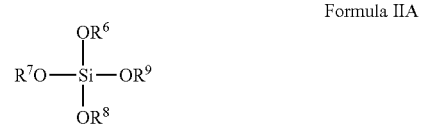

Formula IIA

With reference to Formula IIA, each of $R^6$, $R^7$, $R^8$, and $R^9$ can be the same or different. In some embodiments, each of $R^6$, $R^7$, $R^8$, and $R^9$ independently can be selected from aliphatic, heteroaliphatic, haloaliphatic, haloheteroaliphatic, aromatic, or an organic functional group provided by any combination of such groups. In some embodiments, each of $R^6$, $R^7$, $R^8$, and $R^9$ independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In particular embodiments, each of $R^6$, $R^7$, $R^8$, and $R^9$ independently can be lower alkyl, such as methyl, ethyl, propyl, butyl, pentyl, hexyl, heptyl, octyl, nonyl, or decyl (including straight chain, branched, and cyclic versions thereof). In some representative embodiments, each of $R^6$, $R^7$, $R^8$, and $R^9$ independently can be ethyl or propyl. In particular representative embodiments, the silicon-containing crosslinker is tetraethyl orthosilicate, tetrapropyl orthosilicate, H—Si(OEt)$_3$, Me-Si(OEt)$_3$, Et-Si(OEt)$_3$, Pr—Si(OEt)$_3$, Bu-Si(OEt)$_3$, or (OEt)$_3$Si—O—Si(OEt)$_3$).

The curing agent can be an organometallic compound, such as a tin-containing organometallic compound, a platinum-containing organometallic compound, or a combination thereof; or a peroxide-based compound, such as 2,5-dimethyl-2,5-di(t-butylperoxy)hexyne-3, 2,5-dimethyl-2,5-di(t-butylperoxy)hexane, di-(2-t-butylperoxy-isopropyl) benzene, dicumyl peroxide, butyl 4,4-di-(t-butylperoxy) valerate, 1,1-di(t-butylperoxy)-3,3,5-trimethylcyclohexane, and the like. In particular embodiments, the curing agent is selected depending on the silicone precursor used In particular embodiments, the curing agent is tin(II)ethylhexanoate. In an independent embodiment, the curing agent is not a platinum-based catalyst, and particularly not chloroplatinic acid (or an alcohol-modified version thereof or a coordination compound thereof); a palladium-based catalyst, and particularly not tetrakis(triphenylphosphine)palladium; or a rhodium-based catalyst, and particularly not chlorotris(triphenylphosphine) rhodium.

The surfactant typically is a nonionic surfactant. In particular embodiments, the surfactant is a sorbitan fatty acid ester; a glycerin fatty acid ester; a polyglycerin fatty acid ester; a sucrose fatty acid ester; a polyethylene glycol (or "PEG") fatty acid ester (or sorbitan fatty acid ester) a polypropylene glycol (or "PPG") fatty acid ester (or sorbitan fatty acid ester), or a copolymer thereof; a polyoxyalkylene-PDMS copolymer; or combinations thereof. In particular embodiments, the surfactant is a sorbitan fatty acid ester, such as a Span® surfactant (e.g., Span® 20, Span® 60, Span® 65, Span® 80, Span® 85, Span® 90, or any combination thereof) or a polyoxyethylene version thereof, such as in a Tween® surfactant (e.g., Tween® 20, Tween® 40, Tween® 60, Tween® 65, Tween® 80, or Tween® 85); a PEG-PDMS copolymer (e.g., dimethylsiloxane-(25-30% Ethylene oxide) block copolymer); or a combination thereof.

The composition further comprises water, which can be deionized or ionized water. In some embodiments, the composition can further comprise a solvent in addition to the water and can facilitate reducing the viscosity of the silicone precursor. In some such embodiments, the additional solvent can be an organic solvent, such as a hydrocarbon solvent (e.g., heptane, heptanes, hexanes, cyclohexane, toluene, pentane, limonene, or the like), a mineral oil (e.g., paraffin oil or the like), or an alcoholic solvent (e.g., methanol, ethanol, or the like). In yet some additional embodiments, the additional solvent can be a solvent having a boiling point ranging from 35° C. to 300° C., such as 35° C. to 250° C., or 60° C. to 250° C., or 70° C. to 250° C., or 80° C. to 225° C. Using such additional solvents can not only facilitate modifying viscosity of the silicone precursor, but it can also facilitate accommodating amounts of any filler material that might be included in the composition, as discussed herein, without increasing the size of any object comprising the resulting silicone-based foam material. For example, in some embodiments, using an additional solvent can facilitate using a higher amount of a filler material by reducing the viscosity of the silicone precursor without concurrently expanding the volume of the silicone-based foam material in any desired object since the size of the object will be reduced once the solvent is evaporated away from the material. The additional solvent also can be used to make objects comprising the silicone-based foam material having a fine resolution. For example, in some embodiments, the resolution of the object can be increased by a factor of two or more by adding the additional solvent into the composition. In some embodiments, the resolution of the object can be tuned using a formula to predict a level of shrinkage that may occur upon drying. In such embodiments, the formula is as provided by Equation 1, below. In particular embodiments, any shrinking/resolution changes that occur in the silicone-based foam material can range from 0.1% to 40%, such as 0.1% to 30%, or 1% to 25%, or 5% to 20%. With reference to Equation 1, the silica is silica that is produced in situ via excess silicon-containing crosslinker and the alcohol includes alcohol by-products produced by reactions of the silicon-containing crosslinker.

$$1-[(\text{silicone precursor+filler material (optional)+silica})\div(\text{silicone precursor+filler material (optional)+silica+solvent+surfactant+alcohol})]^{(1/3)} \quad \text{Equation 1}$$

In some embodiments, the composition can further comprise a filler material. The filler material can be used to modify the density, mechanical properties, or both the density and mechanical properties of the silicone-based foam material formed from the composition. In some embodiments, the filler material can become part of the polymer backbone of the silicone-based foam material such that it is grafted onto the backbone. In particular embodiments, the filler material can be a silica that has been treated to be hydrophobic. In such embodiments, the hydrophobic silica is obtained by treating silica with an oxy-silicon material. The oxy-silicon material can have a structure according to a formula of $(R^{10}O)_2Si(R^{11})_2$, wherein each $R^{10}$ independently is aliphatic or aryl and each $R^{11}$ independently is aliphatic or aryl. In particular embodiments, each $R^{10}$ independently is alkyl (e.g., lower alkyl, such as methyl, ethyl, propyl, butyl, pentyl, hexyl, heptyl, octyl, nonyl, decyl, including any isomers thereof) or phenyl, naphthyl, anthracenyl, or the like. In particular embodiments, each $R^{11}$ independently is alkyl (e.g., lower alkyl, such as methyl, ethyl, propyl, butyl, pentyl, hexyl, heptyl, octyl, nonyl, decyl, including any isomers thereof) or phenyl, naphthyl, anthracenyl, or the like. In exemplary embodiments, the oxy-silicon material is $(MeO)_2Si(Me)_2$. Upon reaction with the silica filler material, the silica is modified by the oxy-silicon material such that Si atoms of the silica filler material are bound to an oxygen atom of the oxy-silicon material (e.g., $Si-O-Si(R^{11})_2OR^{10}$). In yet additional embodiments, the silica filler material can be rendered hydrophobic using an excess of the silicon-containing crosslinker. Without being limited to a particular theory of operation, it currently is believed that the hydrophobic silica filler material can be sequestered in a phase of the composition that contains the silicone precursor and thus can be, in some embodiments, chemically grafted onto the silicone backbone formed during the curing process from the silicone precursor and the silicon-containing crosslinker. This activity and structure is distinct from the structure obtained with conventional silicone-based foam materials having a filler material like silica or diatomaceous earth that has not been treated to obtain a hydrophobic filler material. In such conventional materials, the filler material is physically contained within pores of the silicone-based foam and is not incorporated (or bound) into the backbone of the silicone polymer.

In particular embodiments, the silicone precursor and the silicon-containing crosslinker can be used in amounts that provide a weight percent ratio of the silicone precursor to the silicon-containing crosslinker ranging from 0.25 to 60, such as 0.9 to 30, or 1.2 to 20, or 1.6 to 14, or 2.4 to 14, or 4.5 to 14:1, or 8 to 14, or 9.3 to 14 (wherein such ratios are expressed as the value of the quotient of the silicone precursor amount to the silicon-containing crosslinker amount). In particular embodiments, the weight percent ratio of the silicone precursor to the silicon-containing crosslinker is 0.9, 1, 1.2, 1.3, 1.6, 1.7, 2.4, 2.5, 4.5, 5, 8, 8.1, 8.3, 9.3, 9.6, 13, or 13.3 (wherein such ratios are expressed as the value of the quotient of the silicone precursor amount to the silicon-containing crosslinker amount).

In particular embodiments, the silicone precursor and the surfactant can be used in amounts that provide a weight percent ratio ranging from 3 to 100, such as 9 to 50, or 19.2 to 28, or 19.2 to 26.7, or 19.2 to 22.3 or 19.25 to 20 (wherein such ratios are expressed as the value of the quotient of the silicone precursor amount to the total surfactant amount). In some embodiments, the amount of surfactant can range from 0.3 wt % to 6 wt %, such as 0.5 wt % to 3 wt %, or 1 wt % to 2 wt % of the total volume of the composition. In particular embodiments, the silicone precursor and the surfactant can be used in amounts that provide a weight percent ratio of 19.25, 20, 22.2, or 26.7 (wherein such ratios are expressed as the value of the quotient of the silicone precursor amount to the total surfactant amount).

In some embodiments, the silicon-containing crosslinker and the surfactant can be used in amounts that provide a weight percent ratio of the surfactant to the silicon-containing crosslinker ranging from 0.04 to 0.5, such as 0.05 to 0.5, or 0.06 to 0.5, or 0.08 to 0.5, or 0.1 to 0.5, or 0.2 to 0.5, or 0.3 to 0.5 (wherein such ratios are expressed as the value of the quotient of the total surfactant amount to the silicon-containing crosslinker amount). In particular embodiments, the weight ratio of the surfactant to the silicon-containing crosslinker is 0.05, 0.06, 0.08, 0.12, 0.24, 0.36, or 0.49.

In some embodiments, the silicone precursor and the water can be used in amounts that provide a weight percent ratio of the silicone precursor to the water ranging from 0.09 to 10, such as 0.1 to 8, or 0.2 to 6, or 0.3 to 5, or 0.5 to 4.8, or 1 to 4.75, or 1.2 to 4.75, or 1.5 to 4.75, or 2 to 4.75, or 2.3 to 4.75, or 2.8 to 4.75, or 3.4 to 4.75, or 4 to 4.75 (wherein such ratios are expressed as the value of the quotient of the silicone precursor amount to the water amount). In particular embodiments, the weight ratio of the silicone precursor to the water is 0.3, 0.5, 1, 1.1, 1.2, 1.3, 1.5, 1.6, 1.9, 2.1, 2.3, 2.9, 3, 3.5, 4.1, 4.6, or 4.7.

In some embodiments, the curing agent can be used in an amount ranging from 0.1 wt % to 4 wt %, such as 0.3 wt % to 3 wt %, or 0.3 wt % to 1 wt %, or 0.3 wt % to 0.7 wt % (based on the amount of the silicone precursor).

In embodiments further comprising a solvent, the solvent can be present in an amount that provides a weight percent ratio of the silicone precursor to the solvent of 2.2 to 2.5, such as 2.2, 2.3, 2.4, or 2.5 (wherein such ratios are expressed as the value of the quotient of the silicone precursor amount to the solvent amount).

In some embodiments, if a filler is used, it can be used in a suitable amount depending on the desired density, porosity, or both density and porosity of the silicone-based foam material. In some embodiments, the filler can be used in an amount ranging from 0.1 wt % to 1 wt %, such as 0.1 wt % to 0.5 wt %, or 0.1 wt % to 0.4 wt %, or 0.1 wt % to 0.3 wt % (based on the amount of the silicone precursor). In some embodiments, 0.16 wt % and 0.34 wt % (based on the amount of the silicone precursor) of the filler can be used.

Also disclosed herein are embodiments of silicon-containing materials that can be made from the silicone-based foam material. In particular embodiments, the silicon-containing material of the present disclosure is made from the silicone-based foam material described herein using a heat treatment protocol as described herein. In some embodiments, the silicon-containing material comprises silica ($SiO_2$), SiOC, SiC, SiCN, or other carbides, nitrides, and/or sulfides of silicon. These materials comprise an internal pore structure. In particular embodiments, the $SiO_2$ material consists essentially of $SiO_2$. In such embodiments, the $SiO_2$ material is free of any materials or compounds that deleteriously affect the porosity, stability, and/or structural integrity of the material. Representative examples of such materials or compounds can include excess curing agent, organic components, and/or carbonaceous decomposition products that may be produced when making the silicone-based foam material. In other embodiments, the $SiO_2$ material consists of $SiO_2$ and thus is a pure $SiO_2$ material. The silicon-based materials are capable of withstanding high temperatures and exhibit good mechanical stability.

Figure 2:
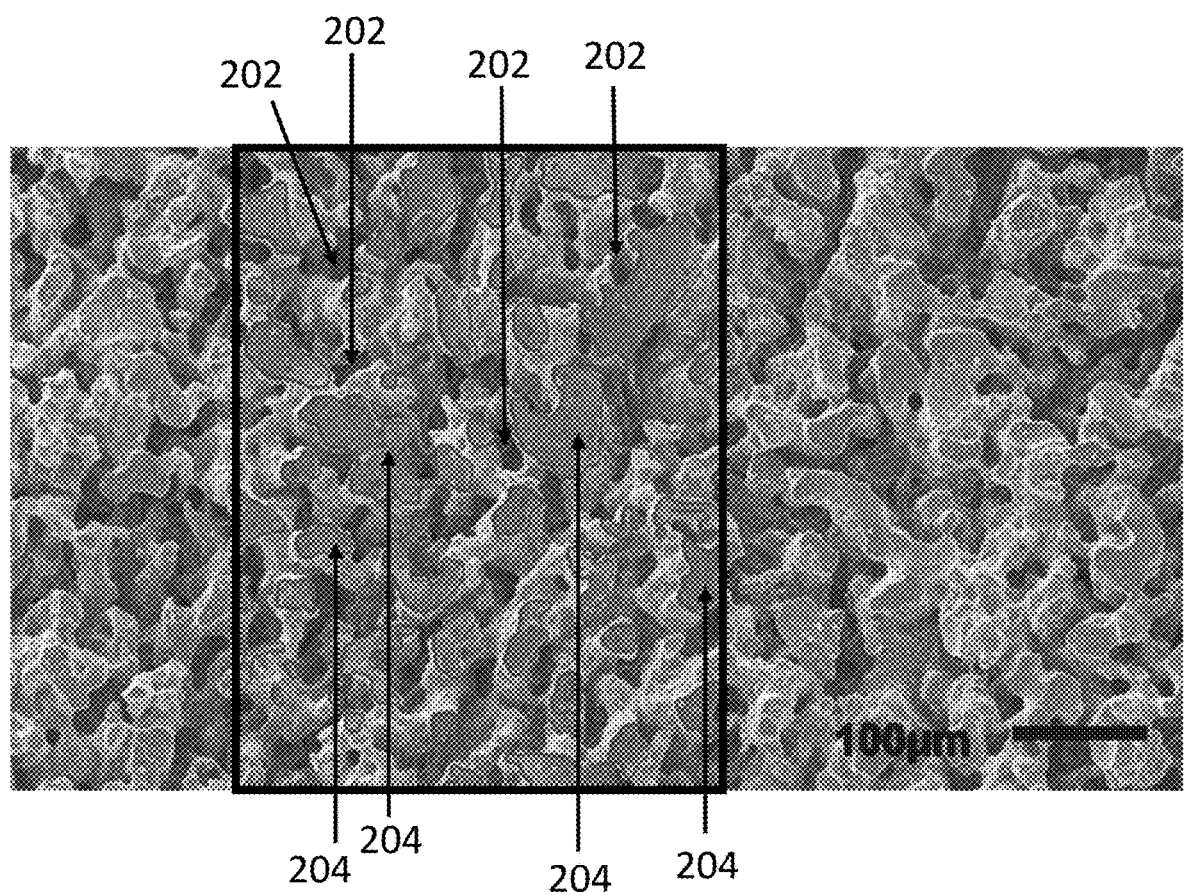
FIG. 2 is an SEM micrograph of a silicone-based foam material disclosed herein, which illustrates features of the silicone-based foam material, including the open-celled structure of the material, the co-continuous nature of the pores and silicone polymer of the material, as well as the homogenous distribution of pores within the material.

The disclosed composition can be used to make a silicone-based foam material that comprises pores throughout the foam material, wherein walls of the pores are defined by a surface of a silicone polymer that is formed by curing the silicone precursor and the silicon-containing crosslinker. Such pore structures can be retained in any silicon-based material formed from the silicone-based foam material. In particular embodiments, the silicone polymer produced from composition embodiments disclosed herein provides a first continuous phase of the silicone-based foam material or the silicon-based material formed therefrom and the pores provide a second continuous phase of the silicone-based foam material or the silicon-based material formed therefrom. Such silicone-based foam material embodiments, and any silicon-based material formed therefrom, thus comprise a co-continuous structure comprising the solid phase provided by the silicone polymer and the void phase of the pores. These different continuous phases can exist simultaneously throughout the volume of the silicone-based foam material or the silicon-based material formed therefrom. In particular embodiments, the silicone-based foam material or the silicon-based material formed therefrom comprises an open-celled structure wherein pores within the foam material are in fluid communication with one another and thus are "open." In particular embodiments, at least 90% of the pores of the silicone-based foam material are open, such as at least 90% to 100%, or 90% to 98%, or 95% to 98% of the pores are open. FIG. 1 provides an SEM micrograph showing the open-celled structure obtained in an exemplary silicone-based foam material. FIG. 2 is an annotated SEM micrograph that highlights structural features of an exemplary silicone-based foam material, including pores 202 formed in the material (such pores being formed without the need for a blowing agent) and the silicone polymer regions 204 formed in the material. In an independent embodiment, the silicone-based foam material and the silicon-based material formed therefrom are not closed-cell materials. In some embodiments, a silicone-based foam material (or the silicon-based material formed therefrom) having a porosity of at least 40% can comprise closed pores at a level of less than 1.2% of the total pore volume. In some additional embodiments, a silicone-based foam material (or the silicon-based material formed therefrom) having 50% porosity can comprise closed pores at a level of 0.08% or less of the total pore volume. In particular embodiments, the pores of the silicone-based foam material or the silicon-based material formed therefrom have an average pore diameter ranging from 1 μm to 150 μm, such as 5 μm to 150 μm, or 10 μm to 150 μm, or 10 μm to 100 μm, or 10 μm to 50 μm, or 10 μm to less than 50 μm. In some embodiments, the pores of the silicone-based foam material or the silicon-based material formed therefrom have an average pore diameter that is 200 μm or less or 50 μm or less. The disclosed silicone-based foam material and the silicon-based material formed therefrom also has a pore diameter distribution not obtained in other silicone foam materials available in the art. In some embodiments, the silicone-based foam material and/or the silicon-based material formed therefrom can be made to have non-continuous pores.

Figure 10:
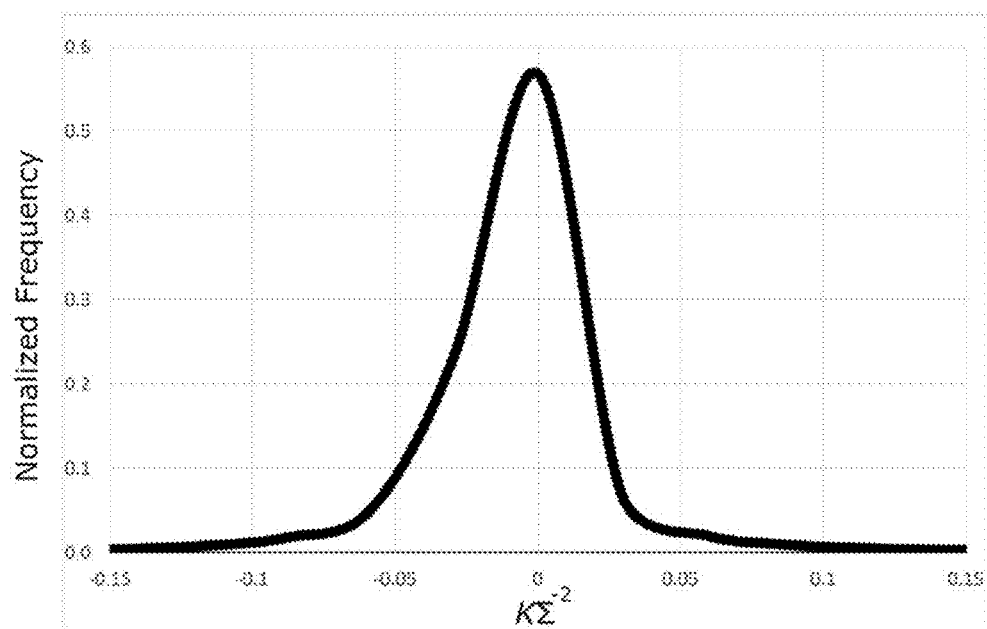
FIG. 10 is a plot showing surface curvature distributions calculated for a silicone-based foam material as disclosed herein, wherein the Gaussian curvatures (K) are shifted towards values less than 0 (that is, the values are substantially negative).
Figure 11:
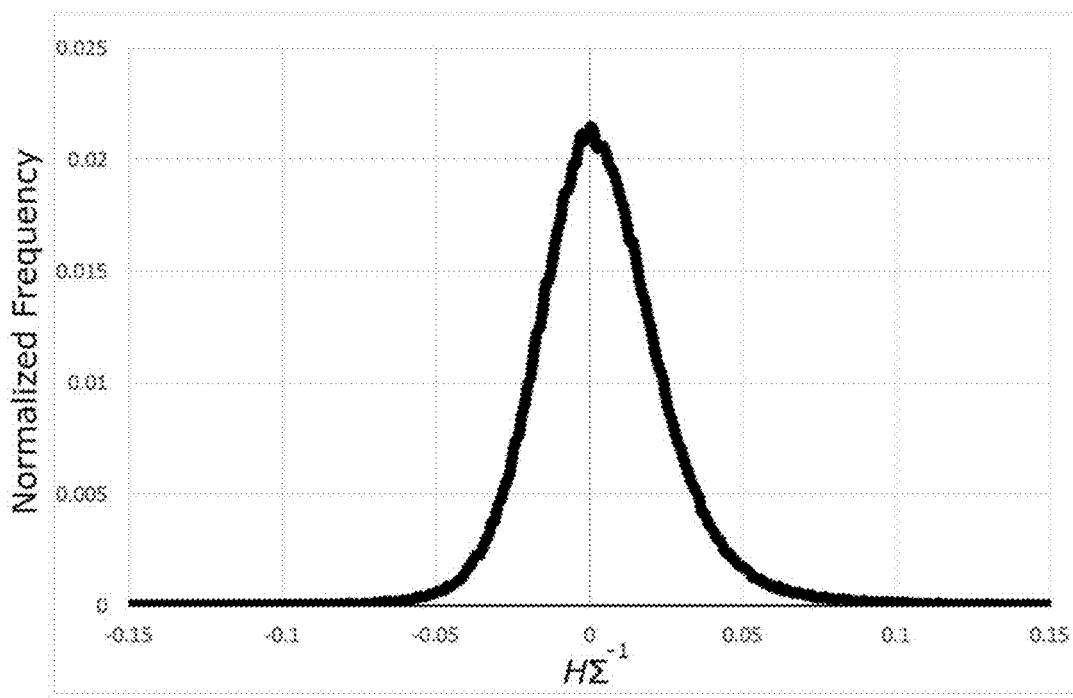
FIG. 11 is a plot showing surface curvature distributions calculated for a silicone-based foam material as disclosed herein, wherein the mean curvature (H) is substantially centered symmetrically on an H value of 0.

The co-continuous nature of the porous silicone-based foam material (or the silicon-based material formed therefrom) results in the silicone-based foam material or the silicon-based material formed therefrom having an average surface curvature that can provide a distinct morphological signature for the material. For example, without being limited to a particular theory, it currently is believed that the co-continuous porous structure of the silicone-based foam material or the silicon-based material formed therefrom may resemble a structure that is formed via spinodal decomposition and thus may exhibit an overall hyperbolic structure. In particular embodiments, the silicone-based foam material or the silicon-based material formed therefrom comprises curved pores that have substantially negative Gaussian curvature (K) on pore walls defined by a surface of the silicone polymer formed from the composition disclosed herein. In such embodiments, K is less than 0. In yet some additional embodiments, the pores can further exhibit a substantially zero mean curvature (H), such that mean curvature values are substantially centered symmetrically on an H value of 0. In some embodiments, the exact peak in distributions of H may vary slightly from 0 if the ratio of the two phases of the silicone-based foam material or the silicon-based material formed therefrom (e.g., the silicone polymer component of the material and air occupying pores defined by the silicone polymer) is not exactly 50:50 by volume (e.g., if 80% of the material is void/pore space and 20% of the material is silicone polymer). FIGS. 10 and 11 show a Gaussian curvature plot and a mean curvature plot, respectively, for an exemplary silicone-based foam material made from a composition comprising a PDMS silicone precursor component (10 g), a TEOS silicon-containing crosslinker component (4 mL), a Span® 80 surfactant component (1 g), a tin(II) ethylhexanoate curing agent (0.03 mL), water (22.7 g), and heptanes (5 mL). The plots shown by these figures were generated from 2-dimensional cross-sectional CT images of the silicone-based foam material and using calculations to obtain the different curvature values. For the calculations, the mean curvature $(H=(½)(k_1+k_2))$ and the Gaussian $(K=k_1k_2)$ curvature are calculated using $k_1$ and $k_2$, which are the principal curvatures $(k_i=\pm 1/R_i$, where $R_i$ are the radii of curvature) at each vertex on a triangulated surface obtained from the CT image. In particular embodiments, the units of H are $\mu m^{-1}$ and the units of K are $\mu m^{-2}$. The probability distributions of obtaining a particular Gaussian or mean curvature are shown by the plots.

IV. Methods

Disclosed herein are embodiments of a method for making the silicone-based foam material. In particular embodiments, the components of the composition are combined and allowed to interact (e.g., such as by mixing) such that curing can take place so as to form the silicone polymer of the silicone-based foam material. The silicone precursor, the silicon-containing crosslinker, the water, the surfactant, and the curing agent can be combined sequentially in any order or can be combined simultaneously. In embodiments comprising any additional components, such as an additional solvent, a filler material, or a combination thereof, the additional components can be added with the other components sequentially in any order or they can be combined simultaneously with the other components. In particular embodiments, the silicone precursor, the silicon-containing crosslinker, and the surfactant, are combined together to provide a first mixture. The curing agent is then added to the first mixture to form a second mixture that is allowed to mix for a sufficient amount of time to incorporate the curing agent. The water is then added to the second mixture to provide a third mixture that can be treated to remove air bubbles (e.g., by placing the third mixture under vacuum). The third mixture can be dried in some embodiments.

Mixing can be achieved using any suitable mixing method, such as hand mixing, homogenizer mixing, or syringe mixing. After the third mixture has been allowed to mix and cure for a sufficient time to provide the silicone-based foam material, it can be injected into a mold to provide an object made of the silicone-based foam material. Without being limited to a single theory, it currently is believed that the co-continuous structure of the silicone-based foam material is promoted by the phase separation that occurs between the water component of the composition and the other components of the composition (e.g., the silicone precursor, silicon-containing crosslinker, etc.) during mixing and thus does not require a blowing agent or water vaporization to form pores. The mixing and phase separation provides a co-continuous matrix of a water phase and a separate phase comprising the components that become cured to provide the silicone polymer. In some embodiments, water can be removed from the silicone-based foam material or the object obtained from the mold. In some embodiments, water can be removed by drying, wicking away the water from the material, or a combination thereof. Upon removing the water, the continuous pore phase of the material that is formed during the method is provided. In some embodiments, water can be removed by drying, which can comprise an affirmative drying step whereby the material is heated to remove water or can comprise removing water simply by allowing the material to sit at ambient temperature for a suitable period of time.

Figures 3A, 3B:
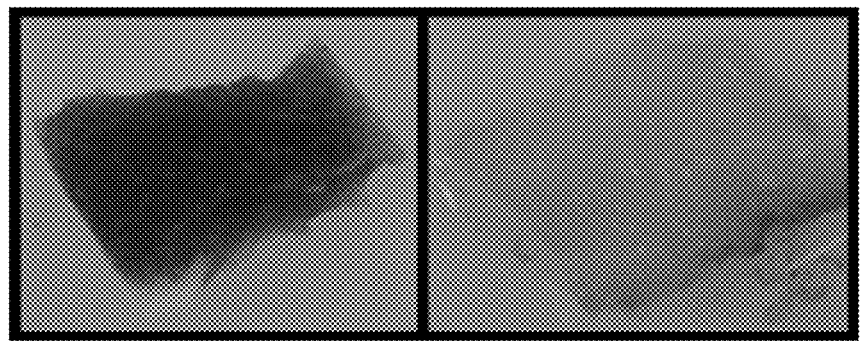
FIG. 3A is a photographic image showing a foam material that has been treated with silver nitrate to detect the level of curing agent present in the embodiment that has not been subjected to a washing treatment.
FIG. 3B is a photographic image showing a foam material that has been treated with silver nitrate to detect the level of curing agent present in the embodiment after being washed with toluene.
Figures 3C, 3D:
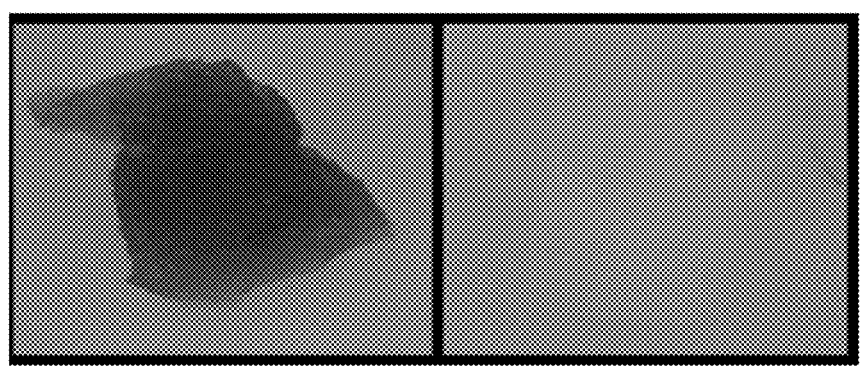
FIG. 3C is a photographic image showing a foam material that has been treated with silver nitrate to detect the level of curing agent present in the embodiment after being washed with ethanol.
FIG. 3D is a photographic image showing a foam material that has been treated with silver nitrate to detect the level of curing agent present in the embodiment after being washed with hydrogen peroxide, wherein most, if not all, residual curing agent has been removed.
Figure 4A:
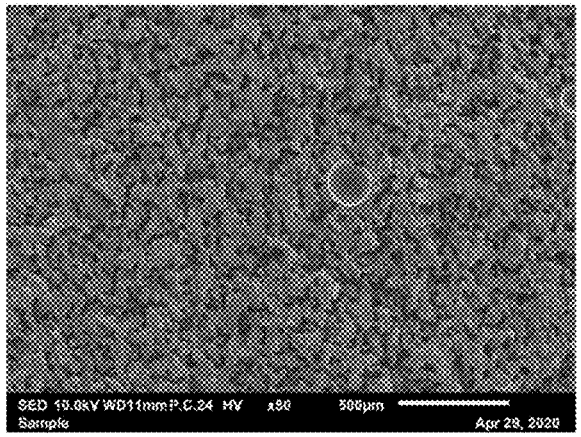
FIG. 4A is an SEM micrograph taken at 50× magnification showing a silicone-based foam material embodiment having 50% porosity at a 500 μm scale.
Figure 4B:
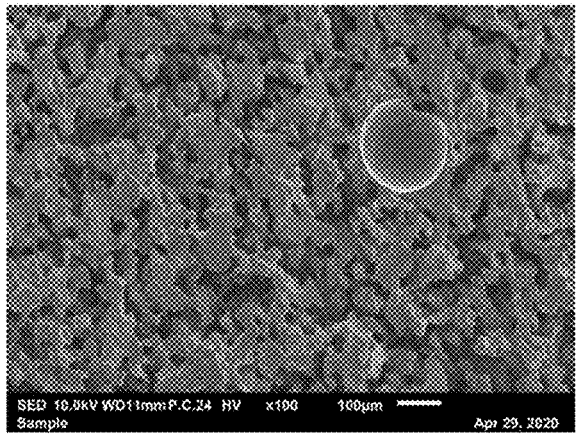
FIG. 4B is an SEM micrograph taken at 100× magnification showing the material of FIG. 4A at a 100 μm scale.
Figure 4C:
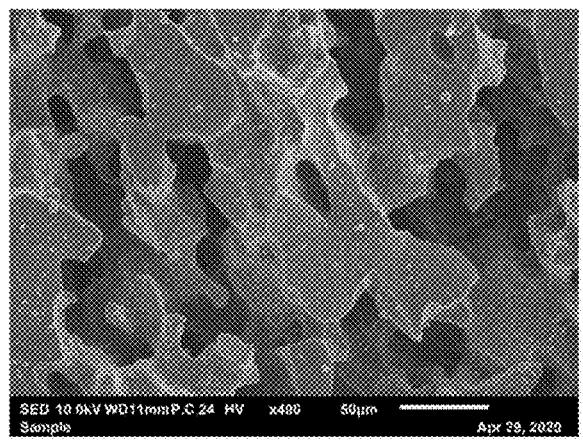
FIG. 4C is an SEM micrograph taken at 400× magnification showing the material of FIG. 4A at a 50 μm scale.
Figure 4D:
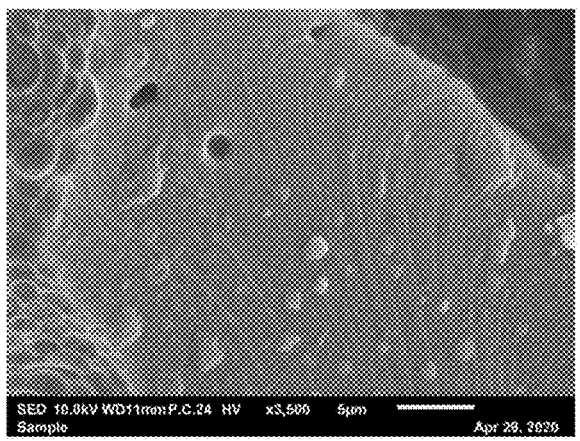
FIG. 4D is an SEM micrograph taken at 3,500× magnification showing the material of FIG. 4A at a 5 μm scale.
Figure 5A:
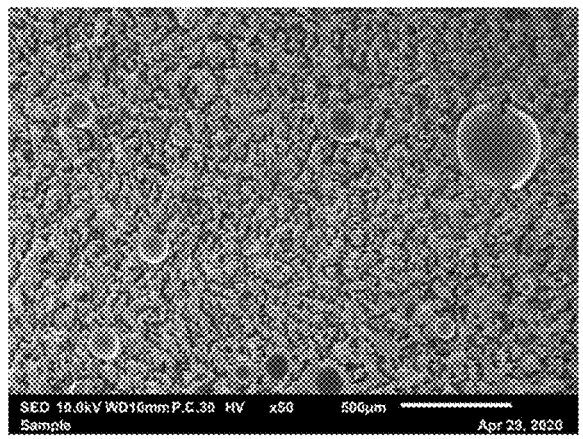
FIG. 5A is an SEM micrograph taken at 50× magnification showing a silicone-based foam material embodiment having 54.5% porosity at a 500 μm scale.
Figure 5B:
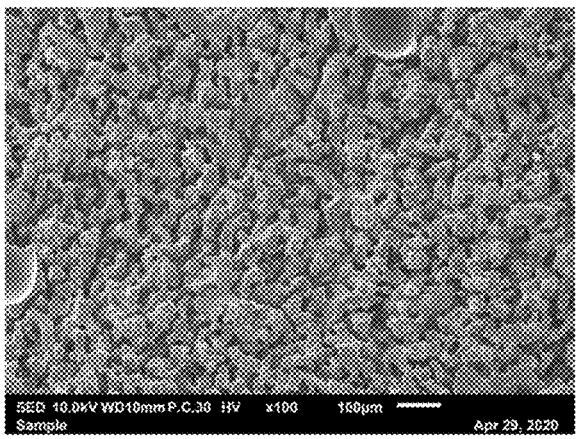
FIG. 5B is an SEM micrograph taken at 100× magnification showing the material of FIG. 5A at a 100 μm scale.
Figure 5C:
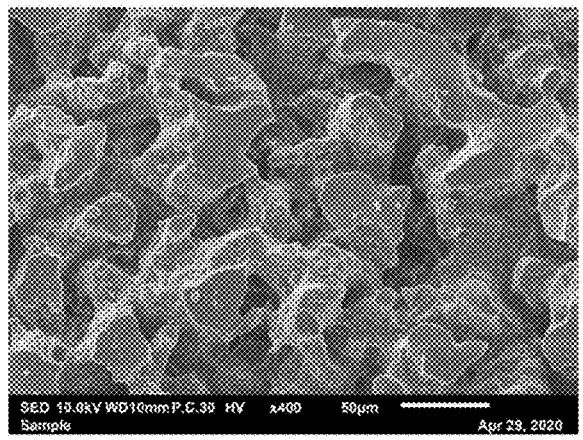
FIG. 5C is an SEM micrograph taken at 400× magnification showing the material of FIG. 5A at a 50 μm scale.
Figure 5D:
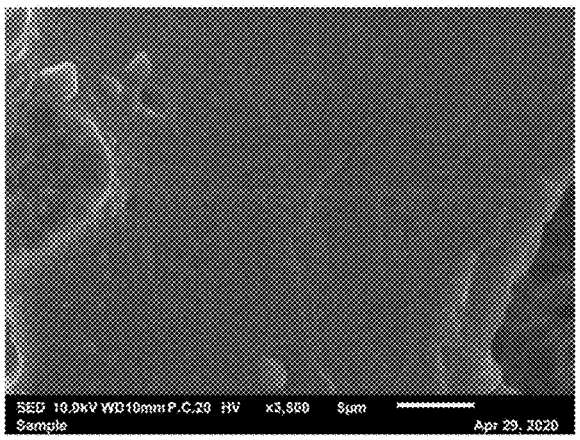
FIG. 5D is an SEM micrograph taken at 3,500× magnification showing the material of FIG. 5A at a 5 μm scale.
Figure 6A:
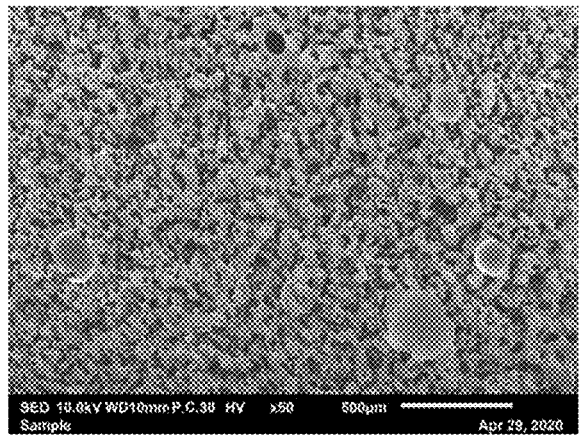
FIG. 6A is an SEM micrograph taken at 50× magnification showing a silicone-based foam material embodiment having 58.3% porosity at a 500 μm scale.
Figure 6B:
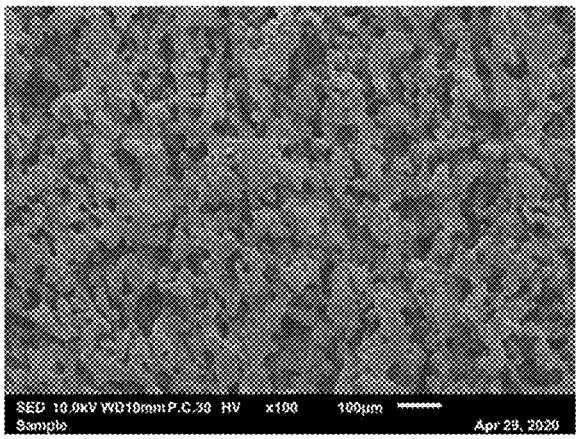
FIG. 6B is an SEM micrograph taken at 100× magnification showing the material of FIG. 6A at a 100 μm scale.
Figure 6C:
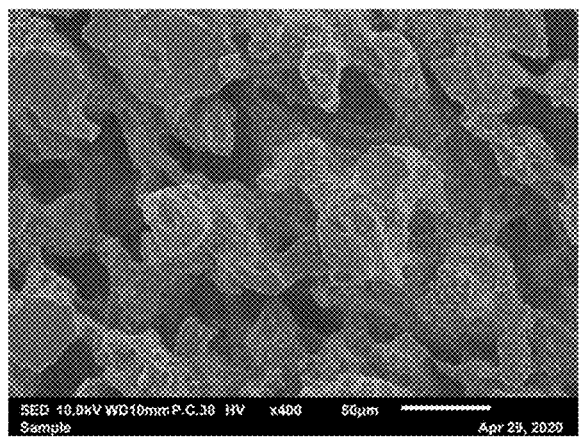
FIG. 6C is an SEM micrograph taken at 400× magnification showing the material of FIG. 6A at a 50 μm scale.
Figure 6D:
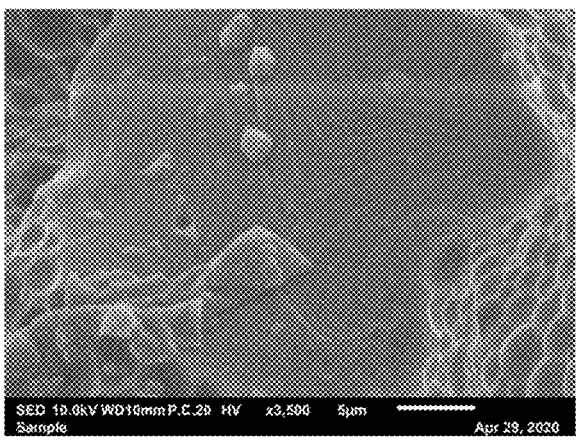
FIG. 6D is an SEM micrograph taken at 3,500× magnification showing the material of FIG. 6A at a 5 μm scale.
Figure 7A:
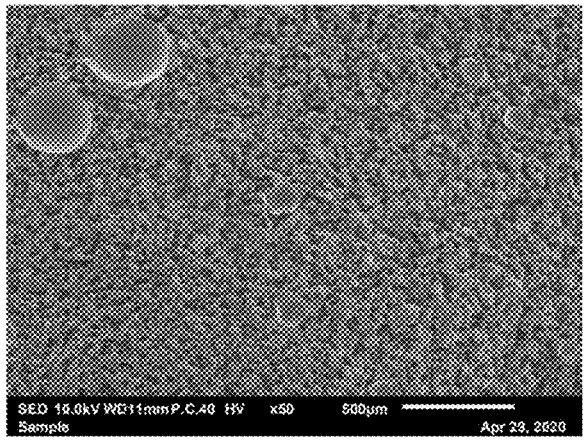
FIG. 7A is an SEM micrograph taken at 50× magnification showing a silicone-based foam material embodiment having 61.5% porosity at a 500 μm scale
Figure 7B:
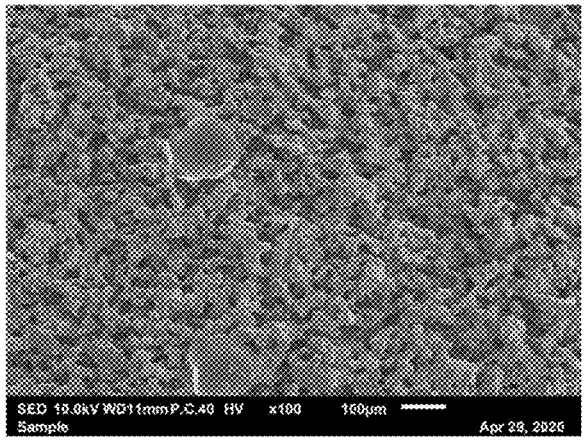
FIG. 7B is an SEM micrograph taken at 100× magnification showing the material of FIG. 7A at a 100 μm scale.
Figure 7C:
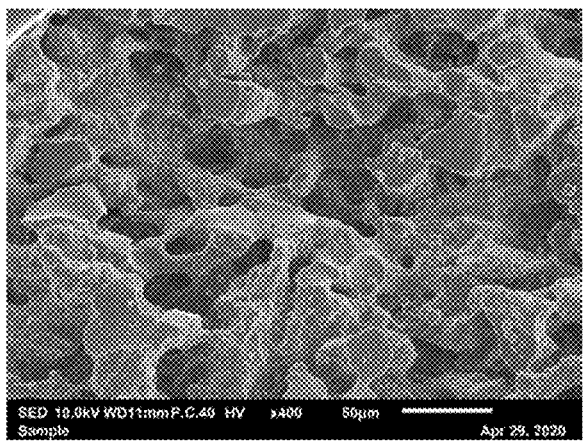
FIG. 7C is an SEM micrograph taken at 400× magnification showing the material of FIG. 7A at a 50 μm scale.
Figure 7D:
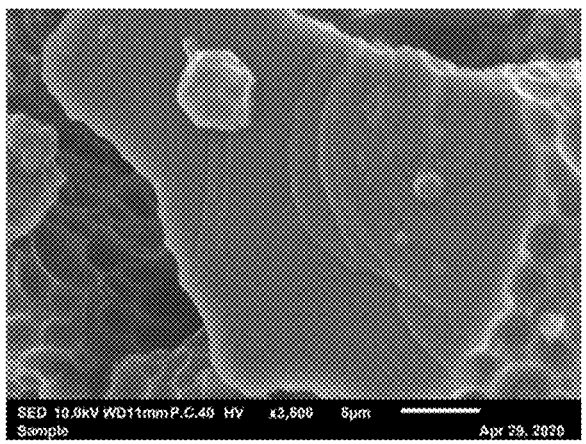
FIG. 7D is an SEM micrograph taken at 3,500× magnification showing the material of FIG. 7A at a 5 μm scale.

In some embodiments, the method can further comprise treating an object formed with the silicone-based foam material with a solution that promotes deactivation of any residual curing agent, removal of any residual curing agent that may be present, or a combination thereof. This can reduce aging of the object; however, this deactivation step is not required as the silicone-based foam material of the present disclosure, on its own, is able to avoid the aging that most conventional foam materials exhibit. In embodiments where the solution is used, it can be a solution comprising hydrogen peroxide. FIGS. 3A-3D show images of different silicone-based foam material embodiments that have been washed with different types of solutions to deactivate residual curing agent, remove residual curing agent, or both. FIG. 3A shows an embodiment without any washing, wherein the presence of excess curing agent is visible (dark color). The curing agent is visualized by exposing the object to silver nitrate. FIG. 3B shows an embodiment that has been washed with toluene, which shows that the object is substantially less dark than the object of FIG. 3A, indicating that much of the curing agent has been removed. FIG. 3C shows another embodiment wherein the object was washed with ethanol, which was not as effective in removing residual curing agent. FIG. 3D shows an embodiment that was washed with hydrogen peroxide, which is able to remove nearly all (if not all) curing agent.

In some embodiments, the method can further comprise exposing the silicone-based foam material to a heat treatment protocol so as to produce a silicon-based material discussed herein from the silicone-based foam material. In such embodiments, the method can comprise exposing the silicone-based foam material to a two-step heat treatment protocol. In other such embodiments, the method can comprise exposing the silicone-based foam material to a one-step heat treatment protocol. In some embodiments, the silicone-based foam material can be converted to different types of silicon-based materials (e.g., materials comprising $SiO_2$, SiOC, SiC, or SiCN) using a heat treatment as described herein and modifying the atmosphere under which the heating takes place. For example, the silicone-based foam material can be heated under an atmosphere of argon or $N_2$ to provide materials comprising $SiO_2$, SiOC, or SiC ceramics; or it can be heated under an atmosphere of $NH_3$ to provide a material comprising SiCN.

In some embodiments of the two-step heat treatment protocol, the first step comprising heating the silicone-based foam material under an atmosphere other than air (e.g., in the presence of an inert gas or other gaseous atmosphere). In some embodiments, an inert atmosphere can be used wherein the silicone-based foam material is heated in the presence of an inert gas, such as $N_2$, Ar, or the like. In other embodiments, the silicone-based foam material can be heated in the presence of other types of gases, such as $NH_3$. The temperature of the environment surrounding the silicone-based foam material used in the first step can be increased gradually from an initial temperature to a final temperature that is higher than the initial temperature. In particular embodiments, the temperature is increased gradually by increasing the temperature by 0.2° C. to 10° C. per minute, such as 0.5° C. to 5° C. per minute, or 1° C. to 3° C. per minute. In particular embodiments, the temperature is increased by 2° C. per minute. The initial temperature can be ambient temperature (e.g., 19° C. to 23° C., or 20° C. to 22° C.) and the final temperature can range from 900° C. to 1500° C. (or higher), such as 950° C. to 1500° C., or 1000° C. to 1250° C., or 950° C. to 1000° C. In particular embodiments, the silicone-based foam material is heated in an environment wherein the temperature is increased by 2° C. per minute from an initial temperature that is ambient temperature to a final temperature ranging from 900° C. to 1500° C. (or higher), such as 950° C. to 1500° C., or 1000° C. to 1250° C., or 950° C. to 1000° C. In exemplary embodiments, the silicone-based foam material is heated in an environment wherein the temperature is increased by 2° C. per minute starting at ambient temperature and ending at a final temperature of 1000° C. Without being limited to a single theory of operation, it currently is believed that this first heat treatment step facilitates converting the silicone to the type of silicon present in the silicon-based material and, in some embodiments, allowing any carbon formed during pyrolysis to form a "scaffold" that facilitates retaining structural integrity of the resulting silicon-based material.

Figure 12:
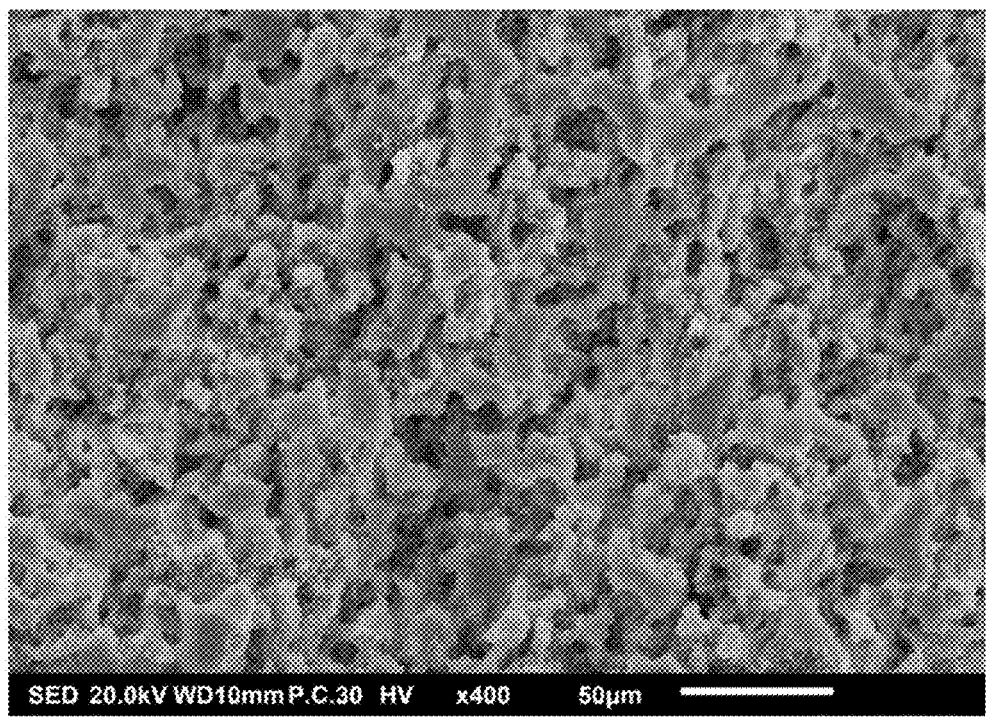
FIG. 12 is an SEM micrograph of a silica material made from exposing a silicone-based foam material to a two-step heat treatment protocol as disclosed herein.

In a second step of the two-step heat treatment protocol, the resulting silicon-based material from the first step can be exposed to a single heat treatment at a temperature sufficient to remove traces of any organic materials that may reside in the silicon-based material. In some independent embodiments, temperature ramping also can be used as described above, but without the gaseous atmosphere (and instead in the presence of air) and ramping within the following temperature ranges. In particular embodiments, the second step can comprise heating the silicon-based material at a temperature ranging from 4500° C. to 600 800° C., such as 525° C. to 575° C., or 550° C. to 575° C., or 525° C. to 550° C. In some embodiments, this second step can be performed in air (that is, an inert atmosphere is not required). In particular embodiment, the second step of the two-step heat treatment protocol comprises heating the resulting silicon-based material in air at a temperature of 550° C. FIG. 12 provides an SEM image of a silica material made from exposing a silicone-based foam material to a two-step heat treatment protocol.

In embodiments using a one-step heat treatment protocol, the method comprises heating the silicone-based foam material under the desired atmosphere (e.g., in the presence of a gas and/or air). In some such embodiments, the temperature of the environment surrounding the silicone-based foam material can be increased gradually from an initial temperature to a final temperature that is higher than the initial temperature. In particular embodiments, the temperature is increased gradually by increasing the temperature by 0.2° C. to 10° C. per minute, such as 0.5° C. to 5° C. per minute, or 1° C. to 3° C. per minute. In particular embodiments, the temperature is increased by 2° C. per minute. The initial temperature can be ambient temperature (e.g., 19° C. to 23° C., or 20° C. to 22° C.) and the final temperature can range from 900° C. to 1500° C. (or higher), such as 950° C. to 1500° C., or 1000° C. to 1250° C., or 950° C. to 1000° C. In particular embodiments, the silicone-based foam material is heated in an environment wherein the temperature is increased by 2° C. per minute from an initial temperature that is ambient temperature to a final temperature ranging from 900° C. to 1500° C. (or higher), such as 950° C. to 1500° C., or 1000° C. to 1250° C., or 950° C. to 1000° C. In exemplary embodiments, the silicone-based foam material is heated in an environment wherein the temperature is increased by 2° C. per minute starting at ambient temperature and ending at a final temperature of 1000° C.

The silicone-based foam material and/or the silicon-based material formed therefrom can be used in myriad applications that utilize foam-based materials and/or silicon materials. The silicone-based foam material and/or the silicon-based material formed therefrom can be used as a component or substrate on its own and/or can be used in combination with other materials to form a component or substrate. The silicone-based foam material and/or the silicon-based material formed therefrom are bio-compatible and have a continuous structure and high surface area that facilitate their use in various types of applications.

V. Overview of Several Embodiments

Disclosed herein are embodiments of a method, comprising: combining a silicone precursor, a silicon-containing crosslinker, a surfactant, a curing agent, and water to provide a multi-phasic composition; mixing components of the multi-phasic composition to provide a silicone polymer; and removing the water to provide a co-continuous silicone-based foam material comprising (i) a first continuous phase comprising the silicone polymer, and (ii) a second continuous phase provided by one or more pores, wherein the one or more pores comprise walls that are defined by a surface of the silicone polymer and that exhibit substantially negative Gaussian curvature and a substantially zero mean curvature; wherein the silicone precursor has a structure according to Formula I as described herein wherein each $R^1$ independently is selected from hydrogen, aliphatic, heteroaliphatic, haloaliphatic, haloheteroaliphatic, aromatic, or an organic functional group provided by any combination of such groups; $R^2$ independently is selected from hydrogen, aliphatic, heteroaliphatic, haloaliphatic, haloheteroaliphatic, aromatic, or an organic functional group provided by any combination of such groups; each $R^3$ independently is hydrogen, aliphatic, heteroaliphatic, haloaliphatic, haloheteroaliphatic, aromatic, or an organic functional group provided by any combination of such groups; each $R^4$ independently is hydrogen, aliphatic, heteroaliphatic, haloaliphatic, haloheteroaliphatic, aromatic, or an organic functional group provided by any combination of such groups; n is an integer selected from 0 to 1,000,000; m is an integer selected from 1 to 1,000,000; and the silicon-containing crosslinker has a structure according to Formula II as described herein wherein each X independently is halogen or $OR^5$, wherein each $R^5$ independently is aliphatic, heteroaliphatic, haloaliphatic, haloheteroaliphatic, aromatic, or an organic functional group provided by any combination of such groups; and Y is (i) $OR^5$, wherein each $R^5$ independently is aliphatic, heteroaliphatic, haloaliphatic, haloheteroaliphatic, aromatic, or an organic functional group provided by any combination of such groups; (ii) —O—Si(X')$_3$, wherein each X' independently is halogen or $OR^5$, wherein each $R^5$ independently is aliphatic, heteroaliphatic, haloaliphatic, haloheteroaliphatic, aromatic, or an organic functional group provided by any combination of such groups; or (ii) hydrogen, aliphatic, heteroaliphatic, haloaliphatic, haloheteroaliphatic, aromatic, or an organic functional group provided by any combination of such groups.

In some embodiments, the method can further comprise (i) adding a filler material, a solvent other than water, or both to the multi-phasic composition; or (ii) washing the co-continuous silicone-based foam material with a solution to remove residual curing agent after removing the water; or (iii) both (i) and (ii).

In any or all of the above embodiments, the filler material is hydrophobic silica that comprises silica bound to an oxy-silicon material, wherein the oxy-silicon material has a structure according to a formula $(R^{10}O)_2Si(R^{11})_2$, wherein each $R^{10}$ independently is aliphatic or aryl and each $R^{11}$ independently is aliphatic or aryl; and wherein the solvent other than water is heptanes.

In any or all of the above embodiments, the solution comprises hydrogen peroxide.

In any or all of the above embodiments, the silicone precursor, the silicon-containing crosslinker, and the surfactant are combined to provide a first mixture and the curing agent is added to the first mixture to provide a second mixture, and then the water is added to the second mixture to provide the multi-phasic composition.

In any or all of the above embodiments, mixing comprises combining components of the multi-phasic composition using syringe mixing.

In any or all of the above embodiments, the method further comprises placing the multi-phasic composition into a mold prior to removing the water.

In any or all of the above embodiments, removing the water comprises (i) drying the co-continuous silicone-based foam material using heat; or (ii) allowing the co-continuous silicone-based foam material to rest at ambient temperature.

In any or all of the above embodiments, the surfactant is selected from a sorbitan fatty acid ester; a glycerin fatty acid ester; a polyglycerin fatty acid ester; a sucrose fatty acid ester; a polyethylene glycol fatty acid ester, a polyethylene glycol sorbitan fatty acid ester, a polypropylene glycol fatty acid ester, a polypropylene glycol sorbitan fatty acid ester, or a copolymer thereof; a polyethylene glycol-polydimethylsiloxane copolymer; or a combination thereof; and the curing agent is tin(II)ethylhexanoate.

In any or all of the above embodiments, the co-continuous silicone-based foam material has an open-celled structure wherein at least 90% of the pores of the plurality of the pores are open.

In any or all of the above embodiments, the method can further comprise: exposing the co-continuous silicone-based foam material to a first heat treatment under a gaseous atmosphere to form a co-continuous porous silicon-based material; and exposing the co-continuous porous silicon-based material to a second heat treatment in the presence of air.

In any or all of the above embodiments, the first heat treatment comprises exposing the co-continuous silicone-based foam material to an environment that has a starting temperature and then increasing the temperature of the environment to a final temperature that is higher than the starting temperature.

In any or all of the above embodiments, the temperature of the environment is increased to the final temperature at a rate ranging from 0.2° C. per minute to 10° C. per minute.

In any or all of the above embodiments, the temperature of the environment is increased to the final temperature at a rate of 2° C. per minute.

In any or all of the above embodiments, the starting temperature is ambient temperature and the final temperature ranges from 900° C. to 1500° C.

In any or all of the above embodiments, the gaseous atmosphere is provided by $N_2$, Ar, or $NH_3$.

In any or all of the above embodiments, the second heat treatment comprises exposing the co-continuous porous silicon-based material to a temperature ranging from 400° C. to 800° C.

In any or all of the above embodiments, the co-continuous porous silicon-based material is $SiO_2$, SiOC, SiC, or SiCN and pores of the co-continuous porous silicon-based material have an average pore diameter of 100 mm or less.

Also disclosed herein are embodiments of a method, comprising: combining a silicone precursor, a silicon-containing crosslinker, a surfactant, a curing agent, and water to provide a multi-phasic composition; mixing components of the multi-phasic composition to provide a silicone polymer; removing the water to provide a co-continuous silicone-based foam material comprising (i) a first continuous phase comprising the silicone polymer, and (ii) a second continuous phase provided by one or more pores, wherein the one or more pores comprise walls that are defined by a surface of the silicone polymer and that exhibit substantially negative Gaussian curvature and a substantially zero mean curvature; exposing the co-continuous silicone-based foam material to a first heat treatment under a gaseous atmosphere to form a co-continuous porous silicon-based material; and exposing the co-continuous porous silicon-based material to a second heat treatment in the presence of air; wherein the silicone precursor has a structure according to Formula I as described herein and the silicon-containing crosslinker has a structure according to Formula II as described herein.

In some embodiments, the first heat treatment comprises exposing the co-continuous silicone-based foam material to an environment that has a starting temperature and then increasing the temperature of the environment to a final temperature that is higher than the starting temperature; wherein (i) the temperature of the environment is increased to the final temperature at a rate ranging from 0.2° C. per minute to 10° C. per minute; (ii) the starting temperature is ambient temperature and the final temperature ranges from 900° C. to 1500° C.; (iii) the second heat treatment comprises exposing the co-continuous porous silicon-based material to a temperature ranging from 400° C. to 800° C.; and (iv) the gaseous atmosphere is provided by $N_2$ or Ar.

VI. Examples

In the following examples, the silicone precursor, the silicon-containing crosslinker, and the surfactant (or a combination of surfactants A and B), are combined together. The curing agent is then added, followed by the water. In embodiments comprising a filler material, an additional solvent, or a combination thereof, these components are added in any order, with particular embodiments involving adding a first amount of the silicone precursor into the filler material to provide a paste and then adding the remaining silicone precursor amount, followed by adding the silicon-containing crosslinker, the surfactant, and any additional solvent, if used. The resulting mixture is mixed using hand mixing, homogenizer mixing, or syringe mixing and it is then cured in a mold. In some embodiments using syringe mixing, the filler material and the silicone precursor are pre-mixed and added into a syringe along with the surfactant. The entire syringe is then placed under vacuum to remove air bubbles. A second syringe first is charged with water, and then with the silicon-containing crosslinker. If additional solvent is used, it is added to the second syringe such that it is positioned top of the water, or it is added to the first syringe after it is removed from vacuum. The curing agent is then added to one of the syringes. The syringes are connected together via a tube and the materials are mixed by passing them between the syringes.

Curing is conducted at room temperature or at a temperature of 100° C. or less. Then, the resulting objects are dried either at ambient temperature or in an oven at a temperature ranging from 60° C. to 140° C. Some examples are exposed to further drying under vacuum.

Components and amounts used in this example are provided by Table 1. With reference to the examples summarized by Table 1, the components that were used are summarized by Table 2. Results for the density, porosity level, and shrinkage of the materials are summarized in Table 3.

TABLE 3

| Example | Density* (g/mL) | Porosity (%) | Shrinkage (%) |
|---|---|---|---|
| 1 | 0.500 | 53.2 | 15 |
| 2 | 0.799 | 30.9 | 15 |
| 3 | 0.350 | 64.9 | 5.8 |
| 4 | 0.350 | 65.9 | 10.3 |
| 5 | 0.350 | 66.9 | 13.9 |
| 6 | 0.350 | 67.7 | 16.9 |
| 7 | 0.350 | 68.5 | 19.4 |
| 8 | 0.489 | 55.6 | 3.4 |
| 9 | 0.599 | 45.7 | 3.4 |
| 10 | 0.790 | 28.4 | 3.4 |
| 11 | 0.891 | 19.2 | 3.4 |
| 12 | 1.103 | 0 | 3.4 |
| 13 | 0.500 | 50 | 3.6 |
| 14 | 0.600 | 50 | 3.2 |
| 15 | 0.700 | 50 | 2.8 |
| 16 | 0.800 | 50 | 2.3 |
| 17 | 0.900 | 50 | 1.8 |
| 18 | 0.500 | 50 | 3.6 |
| 19 | 0.500 | 55 | 3.4 |
| 20 | 0.500 | 60 | 3.1 |
| 21 | 0.500 | 65 | 2.7 |
| 22 | 0.500 | 70 | 2.1 |

*Theoretical density values—obtained by dividing the final mass by the final volume, such as by using the formula below. Empirical density values can be obtained by mea-

TABLE 1

| Example | Silicone Precursor (g) | Water (g) | Curing Agent (mL) | Filler Material (g) | Silicon-containing Crosslinker (mL) | Surfactant (g) A | Surfactant (g) B | Additional Solvent (mL) |
|---|---|---|---|---|---|---|---|---|
| 1 | 77.000 | 158.000 | 0.300 | 12.000 | 8.000 | 4.000 | 0 | 45.300 |
| 2 | 71.120 | 61.056 | 0.200 | 24.457 | 5.333 | 2.667 | 0 | 47.133 |
| 3 | 20.000 | 46.756 | 0.100 | 0 | 4.000 | 0.5 | 0.5 | 0 |
| 4 | 20.000 | 57.816 | 0.100 | 0 | 8.000 | 0.5 | 0.5 | 0 |
| 5 | 20.000 | 69.556 | 0.100 | 0 | 12 | 0.5 | 0.5 | 0 |
| 6 | 20.000 | 81.937 | 0.100 | 0 | 16 | 0.5 | 0.5 | 0 |
| 7 | 20.000 | 94.925 | 0.100 | 0 | 20 | 0.5 | 0.5 | 0 |
| 8 | 34.982 | 55.272 | 0.140 | 7.696 | 4.198 | 0.875 | 0.700 | 0 |
| 9 | 42.761 | 45.327 | 0.171 | 9.407 | 5.131 | 1.069 | 0.855 | 0 |
| 10 | 56.225 | 28.112 | 0.225 | 12.369 | 6.747 | 1.406 | 1.124 | 0 |
| 11 | 63.348 | 19.004 | 0.253 | 13.937 | 7.602 | 1.584 | 1.267 | 0 |
| 12 | 78.212 | 0.000 | 0.313 | 17.207 | 9.385 | 1.955 | 1.564 | 0 |
| 13 | 78.212 | 92.652 | 0.313 | 2.150 | 9.385 | 1.955 | 1.564 | 0 |
| 14 | 78.212 | 104.930 | 0.313 | 33.460 | 9.385 | 1.955 | 1.564 | 0 |
| 15 | 78.212 | 121.480 | 0.313 | 75.660 | 9.385 | 1.955 | 1.564 | 0 |
| 16 | 78.212 | 144.997 | 0.313 | 135.629 | 9.385 | 1.955 | 1.564 | 0 |
| 17 | 78.212 | 181.056 | 0.313 | 227.581 | 9.385 | 1.955 | 1.564 | 0 |
| 18 | 78.212 | 92.652 | 0.313 | 2.149 | 9.385 | 1.955 | 1.564 | 0 |
| 19 | 78.212 | 121.064 | 0.313 | 18.470 | 9.385 | 1.955 | 1.564 | 0 |
| 20 | 78.212 | 162.886 | 0.313 | 42.792 | 9.385 | 1.955 | 1.564 | 0 |
| 21 | 78.212 | 230.891 | 0.313 | 82.917 | 9.385 | 1.955 | 1.564 | 0 |
| 22 | 78.212 | 362.140 | 0.313 | 161.653 | 9.385 | 1.955 | 1.564 | 0 |

TABLE 2

| Silicone Precursor | Curing Agent | Filler Material | Silicon-containing Crosslinker | Surfactant A | Surfactant B | Additional Solvent |
|---|---|---|---|---|---|---|
| PLY 7609 | Tin(II)ethylhexanoate | Silica treated with MeOSi(CH$_3$)$_2$OMe | TEOS | Span 80 | PEG/PDMS copolymer surfactant | Heptanes | suring the thickness of a thin circular sheet of the silicone-based foam material and measuring the weight of the thin circular sheet.

[mass of silicone precursor(s)+filler material+silica (produced in situ by the silicon-containing crosslinker)]÷[volume of silicone precursor(s)+ filler material+silica (produced in situ by the silicon-containing crosslinker)+water x (1−anticipated shrinkage %)^3]

Porosity values are obtained by calculating the total volume of the pores in the silicone-based foam material and dividing the total pore volume by the sum of the total pore volume and the volume of the substances that remain in the final product (e.g., any silicone precursor, any filler material, and silica formed by the silicon-containing precursor). The total volume of the pores is determined by subtracting the amount of water which is consumed in the various chemical reactions taking place from the volume of the water, and scaling this volume down by any shrinkage (by multiplying the value by (1−the percent for each dimension)^3). Shrinkage values are determined using the calculation provided herein.

Figure 8:
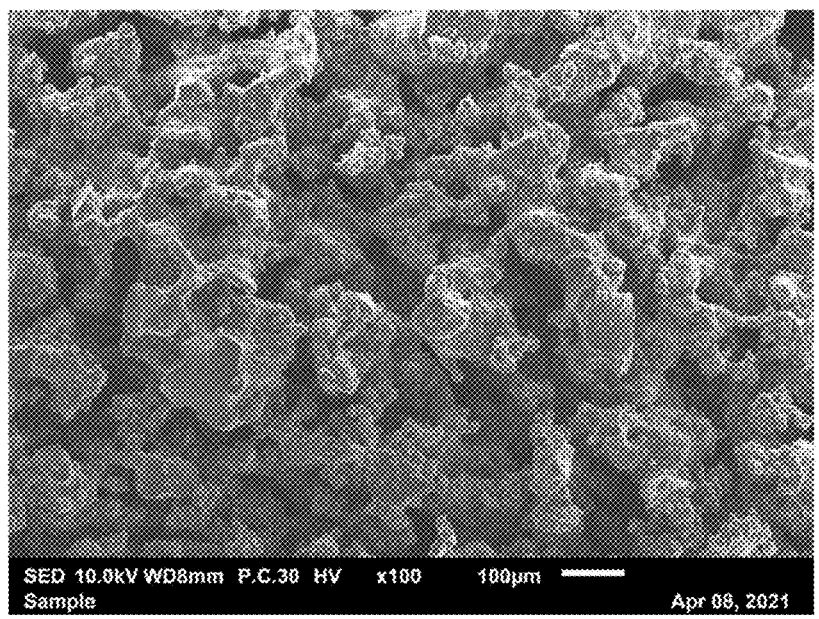
FIG. 8 is an SEM micrograph of a silicone-based foam material embodiment made using a mixture of two different silicone precursors and also including a filler material.
Figure 9:
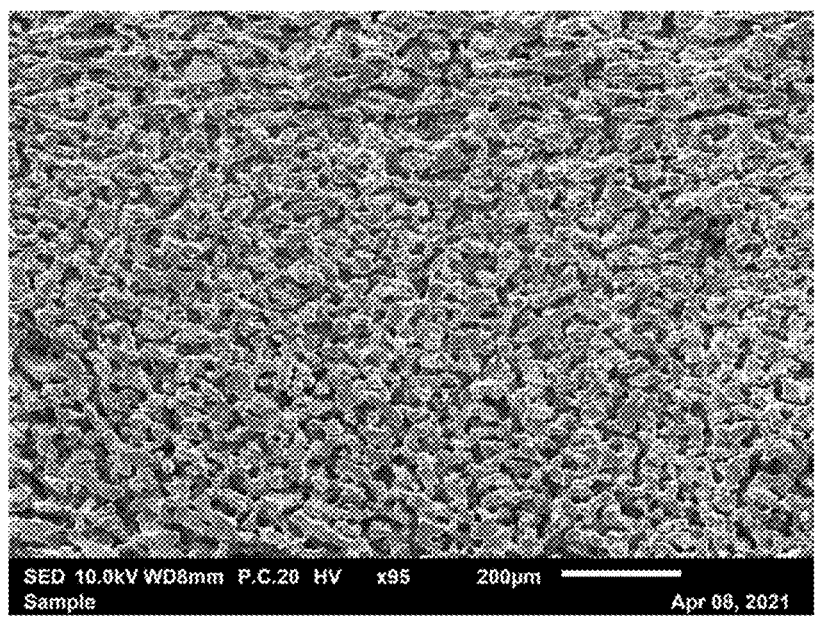
FIG. 9 is an SEM micrograph of a silicone-based foam material embodiment made without a filler material.

FIGS. 4A-4D through 7A-7D and FIGS. 8 and 9 provide SEM micrographs of exemplary silicone-based foam materials having different levels of porosity. FIGS. 4A-4D are micrographs at different magnifications for an example having 50% porosity. FIGS. 5A-5D are micrographs at different magnifications for an example having 54.5% porosity. FIGS. 6A-6D are micrographs at different magnifications for an example having 58.3% porosity. And, FIGS. 7A-7D are micrographs at different magnifications for an example having 61.5% porosity. FIG. 8 is a micrograph of an embodiment made using 14.75 g of PS347 (a silicone precursor) and 2 g of PLY 7601 (a silicone precursor) in combination with 26 g of water, 3 g of a silica filler material, 1 mL TPOS (a silicon-containing crosslinker), 1.5 g SPAN® 80, and 0.2 mL tin(II)ethylhexanoate. FIG. 9 is a micrograph of an embodiment made using 14.75 g of PS347 (a silicone precursor) in combination with 21 g of water, 3 mL TPOS (a silicon-containing crosslinker), 1.5 g SPAN® 80, and 0.06 mL tin(II)ethylhexanoate.

In another example, a silicone-based foam material is subjected to a heat treatment. The material is heated under $N_2$ and the temperature is ramped up from ambient temperature to 1000° C. at a rate of 2° C. per minute. The material is then heated under air at a temperature of 550° C. to remove trace organic materials. The resulting material is a porous silica material.

In view of the many possible embodiments to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:

1. A method, comprising:
   combining a silicone precursor, a silicon-containing crosslinker, a surfactant, a curing agent, and water to provide a multi-phasic composition;
   mixing components of the multi-phasic composition to provide a silicone polymer;
   removing the water to provide a co-continuous silicone-based foam material comprising (i) a first continuous phase comprising the silicone polymer, and (ii) a second continuous phase provided by one or more pores, wherein the one or more pores comprise walls that are defined by a surface of the silicone polymer and that exhibit substantially negative Gaussian curvature and a substantially zero mean curvature;
   exposing the co-continuous silicone-based foam material to a first heat treatment under a gaseous atmosphere to form a co-continuous porous silicon-based material; and
   exposing the co-continuous porous silicon-based material to a second heat treatment in the presence of air;
   wherein
   the silicone precursor has a structure according to Formula I

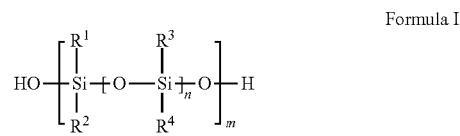

Formula I wherein each $R^1$ independently is selected from hydrogen, aliphatic, heteroaliphatic, haloaliphatic, haloheteroaliphatic, aromatic, or an organic functional group provided by any combination of such groups; $R^2$ independently is selected from hydrogen, aliphatic, heteroaliphatic, haloaliphatic, haloheteroaliphatic, aromatic, or an organic functional group provided by any combination of such groups; each $R^3$ independently is hydrogen, aliphatic, heteroaliphatic, haloaliphatic, haloheteroaliphatic, aromatic, or an organic functional group provided by any combination of such groups; each $R^4$ independently is hydrogen, aliphatic, heteroaliphatic, haloaliphatic, haloheteroaliphatic, aromatic, or an organic functional group provided by any combination of such groups; n is an integer selected from 0 to 1,000,000; m is an integer selected from 1 to 1,000,000; and
   the silicon-containing crosslinker has a structure according to Formula II

Formula II wherein each X independently is halogen or $OR^5$, wherein each $R^5$ independently is aliphatic, heteroaliphatic, haloaliphatic, haloheteroaliphatic, aromatic, or an organic functional group provided by any combination of such groups; and Y is
   (i) $OR^5$, wherein each $R^5$ independently is aliphatic, heteroaliphatic, haloaliphatic, haloheteroaliphatic, aromatic, or an organic functional group provided by any combination of such groups;
   (ii) —O—Si(X')$_3$, wherein each X' independently is halogen or $OR^5$, wherein each $R^5$ independently is aliphatic, heteroaliphatic, haloaliphatic, haloheteroaliphatic, aromatic, or an organic functional group provided by any combination of such groups; or
   (iii) hydrogen, aliphatic, heteroaliphatic, haloaliphatic, haloheteroaliphatic, aromatic, or an organic functional group provided by any combination of such groups.

2. The method of claim 1, further comprising:
   (i) adding a filler material, a solvent other than water, or both to the multi-phasic composition; or (ii) washing the co-continuous silicone-based foam material with a solution to remove residual curing agent after removing the water; or (iii) both (i) and (ii).

3. The method of claim 2, wherein:

(i) the filler material is hydrophobic silica that comprises silica treated with an oxy-silicon material having a structure according to a formula $(R^{10}O)_2Si(R^{11})_2$, such that the silica and the oxy-silicon material are bound to provide a structure having a formula $Si^a$—O—$Si(R^{11})_2OR^{10}$;

wherein $Si^a$ represents the silica, each $R^{10}$ independently is aliphatic or aryl and each $R^{11}$ independently is aliphatic or aryl; and (ii) wherein the solvent other than water is heptanes.

4. The method of claim 2, wherein the solution comprises hydrogen peroxide.

5. The method of claim 1, wherein the silicone precursor, the silicon-containing crosslinker, and the surfactant are combined to provide a first mixture and the curing agent is added to the first mixture to provide a second mixture, and then the water is added to the second mixture to provide the multi-phasic composition.

6. The method of claim 1, wherein mixing comprises combining components of the multi-phasic composition using syringe mixing.

7. The method of claim 1, further comprising placing the multi-phasic composition into a mold prior to removing the water.

8. The method of claim 1, wherein removing the water comprises (i) drying the co-continuous silicone-based foam material using heat; or (ii) allowing the co-continuous silicone-based foam material to rest at ambient temperature.

9. The method of claim 1, wherein the surfactant is selected from a sorbitan fatty acid ester; a glycerin fatty acid ester; a polyglycerin fatty acid ester; a sucrose fatty acid ester; a polyethylene glycol fatty acid ester, a polyethylene glycol sorbitan fatty acid ester, a polypropylene glycol fatty acid ester, a polypropylene glycol sorbitan fatty acid ester, or a copolymer thereof; a polyethylene glycol-polydimethylsiloxane copolymer; or a combination thereof; and the curing agent is tin(II)ethylhexanoate.

10. The method of claim 1, wherein the co-continuous silicone-based foam material has an open-celled structure wherein at least 90% of the pores are open.

11. The method of claim 1, wherein the first heat treatment comprises exposing the co-continuous silicone-based foam material to an environment that has a starting temperature and then increasing the temperature of the environment to a final temperature that is higher than the starting temperature.

12. The method of claim 11, wherein the temperature of the environment is increased to the final temperature at a rate ranging from 0.2° C. per minute to 10° C. per minute.

13. The method of claim 11, wherein the temperature of the environment is increased to the final temperature at a rate of 2° C. per minute.

14. The method of claim 11, wherein the starting temperature is ambient temperature and the final temperature ranges from 900° C. to 1500° C.

15. The method of claim 1, wherein the gaseous atmosphere is provided by $N_2$, Ar, or $NH_3$.

16. The method of claim 1, wherein the second heat treatment comprises exposing the co-continuous porous silicon-based material to a temperature ranging from 400° C. to 800° C.

17. The method of claim 1, wherein the co-continuous porous silicon-based material is $SiO_2$, SiOC, SiC, or SiCN and pores of the co-continuous porous silicon-based material have an average pore diameter of 100 mm or less.

18. The method of claim 1, wherein the first heat treatment comprises exposing the co-continuous silicone-based foam material to an environment that has a starting temperature and then increasing the temperature of the environment to a final temperature that is higher than the starting temperature; wherein (i) the temperature of the environment is increased to the final temperature at a rate ranging from 0.2° ° C. per minute to 10° ° C. per minute; (ii) the starting temperature is ambient temperature and the final temperature ranges from 900° C. to 1500° C.; (iii) the second heat treatment comprises exposing the co-continuous porous silicon-based material to a temperature ranging from 400° ° C. to 800° C.; and (iv) the gaseous atmosphere is provided by $N_2$ or Ar.

* * * * *